(12) United States Patent
Greenwald et al.

(10) Patent No.: US 11,997,426 B1
(45) Date of Patent: May 28, 2024

(54) SYSTEM AND METHOD FOR GENERATING A PERSONALIZED VIRTUAL STAGE

(71) Applicant: Warmly, Inc., Redwood City, CA (US)

(72) Inventors: Max Greenwald, Denver, CO (US); Carina Boo, Hayward, CA (US); Alan Zhao, Denver, CO (US); Valeria Yermakova, Denver, CO (US); Scott O'Connor, Spokane, WA (US); Zack Zeyu, New York, NY (US)

(73) Assignee: Warmly, Inc., Redwood City, CA (US)

( * ) Notice: Subject to any disclaimer, the term of this patent is extended or adjusted under 35 U.S.C. 154(b) by 101 days.

(21) Appl. No.: 17/867,610

(22) Filed: Jul. 18, 2022

Related U.S. Application Data

(60) Provisional application No. 63/223,458, filed on Jul. 19, 2021.

(51) Int. Cl.
*H04N 7/15* (2006.01)
*G06F 16/335* (2019.01)
*H04N 5/272* (2006.01)

(52) U.S. Cl.
CPC ........... *H04N 7/157* (2013.01); *G06F 16/337* (2019.01); *H04N 5/272* (2013.01)

(58) Field of Classification Search
CPC ....... H04N 7/157; H04N 5/272; G06F 16/337
See application file for complete search history.

(56) References Cited

U.S. PATENT DOCUMENTS

| 11,233,974 | B1 | 1/2022 | Adcock et al. |
| 11,317,060 | B1 | 4/2022 | Libin |
| 11,336,840 | B2 | 5/2022 | Tangeland et al. |
| 2020/0245122 | A1* | 7/2020 | Beyer, Jr .............. H04W 64/00 |
| 2021/0287156 | A1* | 9/2021 | Rogynskyy ........... G06F 16/273 |
| 2023/0237837 | A1* | 7/2023 | Shepherd ............ G06V 40/169 |
|  |  |  | 382/104 |

* cited by examiner

*Primary Examiner* — Phung-Hoang J Nguyen
(74) *Attorney, Agent, or Firm* — Orrick, Herrington & Sutcliffe LLP

(57) ABSTRACT

A system for conducting a video conference and methods for making and utilizing the same. The system can generate a first virtual stage for a first participant in the video conference by selecting one or more items of personal information associated with the first conference participant and disposing the selected personal information items in a predetermined arrangement. The first virtual stage can be transmitted with a first visual image of the first conference participant to a computer system associated with a second conference participant for visual presentation during the video conference. The system advantageously can enable the computer system associated with each conference participate to visually present a visual image with an associated virtual stage for each of the other conference participants.

18 Claims, 17 Drawing Sheets

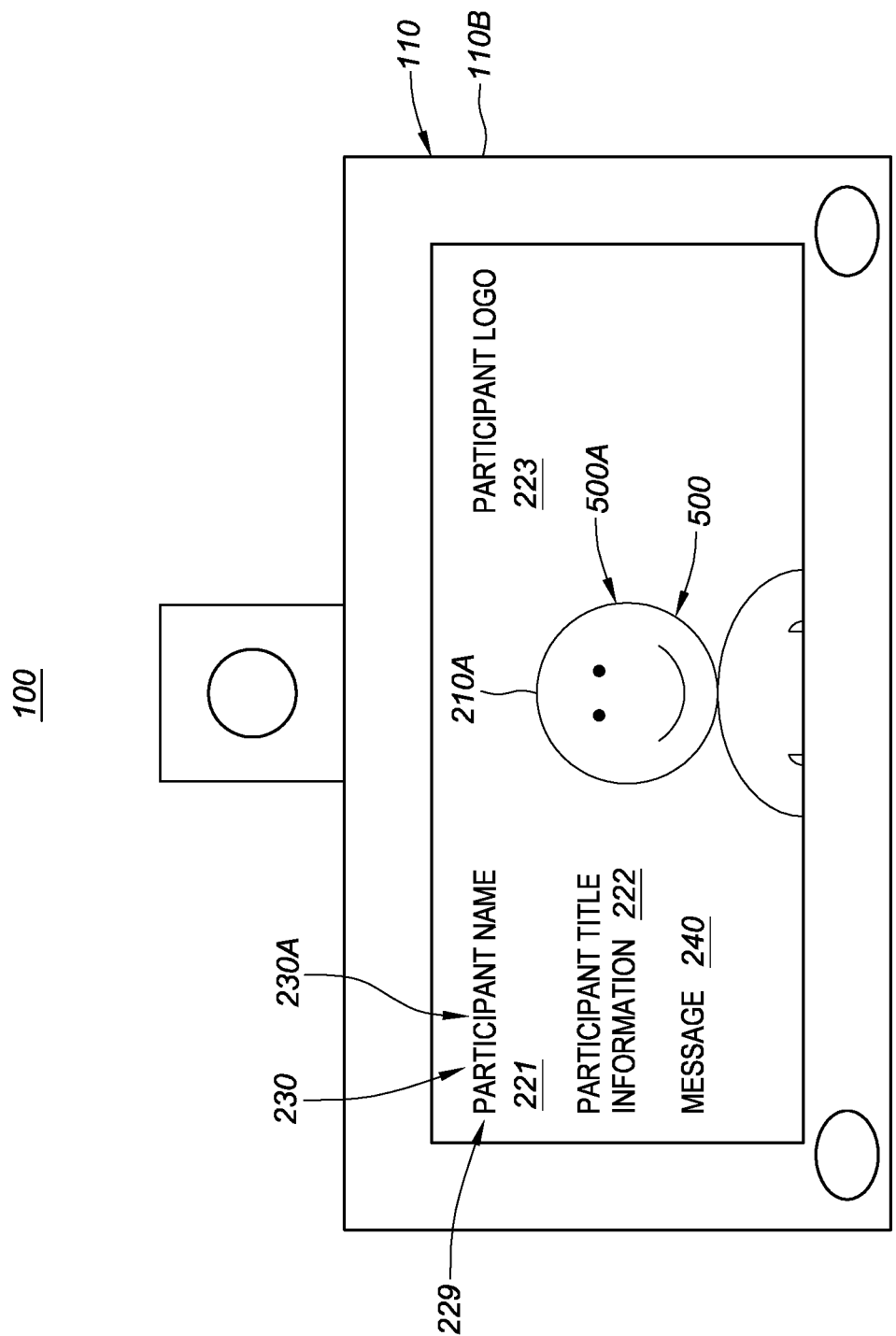

SYSTEM AND METHOD FOR GENERATING A PERSONALIZED VIRTUAL STAGE

CROSS-REFERENCE TO RELATED APPLICATIONS

This application claims the benefit of, and priority to, U.S. Provisional Application Se. No. 63/223,458, filed Jul. 19, 2021, the disclosure of which is hereby incorporated herein by reference in its entirety and for all purposes.

FIELD

The disclosed embodiments relate generally to the field of videoconferencing and more particularly, but not exclusively, to systems and methods for automatically generating a virtual stage with participant personal information for each video conference participant.

BACKGROUND

Meetings conducted via video conference have become much more prevalent. With the recent pandemic, for example, individuals are more reluctant to meet in person and thus rely on video conferences for their discussions.

Conventional video conference systems enable meeting participants in different locations to communicate with each other audibly and visually using their computers. The computer of each participant includes a speaker for audibly presenting comments from the other participants, a microphone for capturing comments by the participant and a camera for capturing an image of the participant. The image of the participant this is visually presented on the computer displays of the other participants often with a virtual background. The virtual background typically is limited to participant-selected still images or video images. The participant-selected images, however, usually depict geographic locations, personal photographs or favorite teams, schools or other organizations.

In view of the foregoing, a need exists for an improved system and method for conducting a video conference with an automatically-generated virtual stage with participant personal information that overcome the aforementioned obstacles and deficiencies of currently-available video conference systems.

BRIEF DESCRIPTION OF THE DRAWINGS

FIG. 9A-D are detail diagrams illustrating another exemplary embodiment of the second participant computer system of FIG. 3A, wherein the second participant computer system presents a message on the virtual stage during the video conference.

Figure 1:
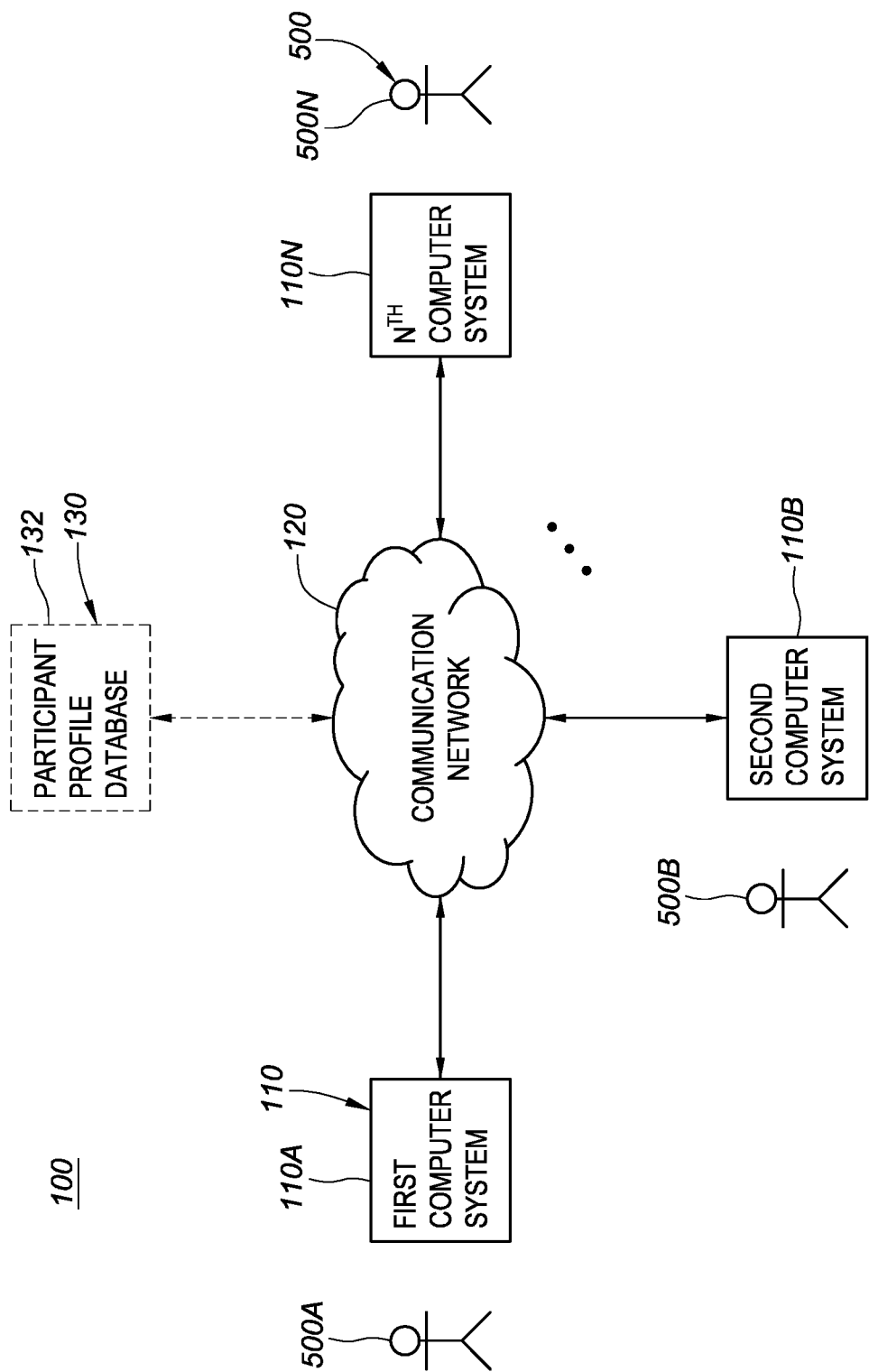
FIG. 1 is a top-level block diagram illustrating an exemplary embodiment of a video conference system for generating a virtual stage with participant personal information.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available video conference systems and methods limit meeting participants to virtual backgrounds that comprise participant-selected still images or video images, a video conference system and method for generating a virtual stage with participant personal information for a meeting participant can prove desirable and provide a basis for a wide range of applications, such as virtual business cards. This result can be achieved, according to one embodiment disclosed herein, by a video conference system 100 as illustrated in FIG. 1.

Turning to FIG. 1, the video conference system 100 is shown as including a predetermined number N of participant computer systems 110 that are respectively associated with one or more video conference participants (or users) 500. One or more conference participants 500 can be associated with each participant computer system 110. The participant computer systems 110 can include one or more desktop computers, one or more laptop computers, one or more palmtop computers and/or one or more smart telephones, without limitation. In selected embodiments, the participant computer systems 110 can be close to, and/or remote from, each other. In other words, a first participant computer system 110A associated with a first conference participant 500A can be proximal to a second participant computer system 110B associated with a second conference participant 500B and/or distal from an Nth participant computer system 110N associated with an Nth conference participant 500C.

The participant computer systems 110 can be configured to communicate directly and/or, as illustrated in FIG. 1, indirectly via a communication network (or circuit) 120, such as the Internet. The communication network 120 can be provided as a conventional wired and/or wireless communication network, including a telephone network, a local area network (LAN), a wide area network (WAN), a campus area network (CAN), personal area network (PAN) and/or a wireless local area network (WLAN), of any kind. Exemplary wireless local area networks include wireless fidelity (Wi-Fi) networks in accordance with Institute of Electrical and Electronics Engineers (IEEE) Standard 802.11, Bluetooth networks in accordance with Institute of Electrical and Electronics Engineers (IEEE) Standard 802.15.1, and/or wireless metropolitan-area networks (MANs), which also are known as WiMax Wireless Broadband, in accordance with IEEE Standard 802.16. The participant computer systems 110 thereby can enable the conference participants 500 to conduct a video conference.

Figure 2A:
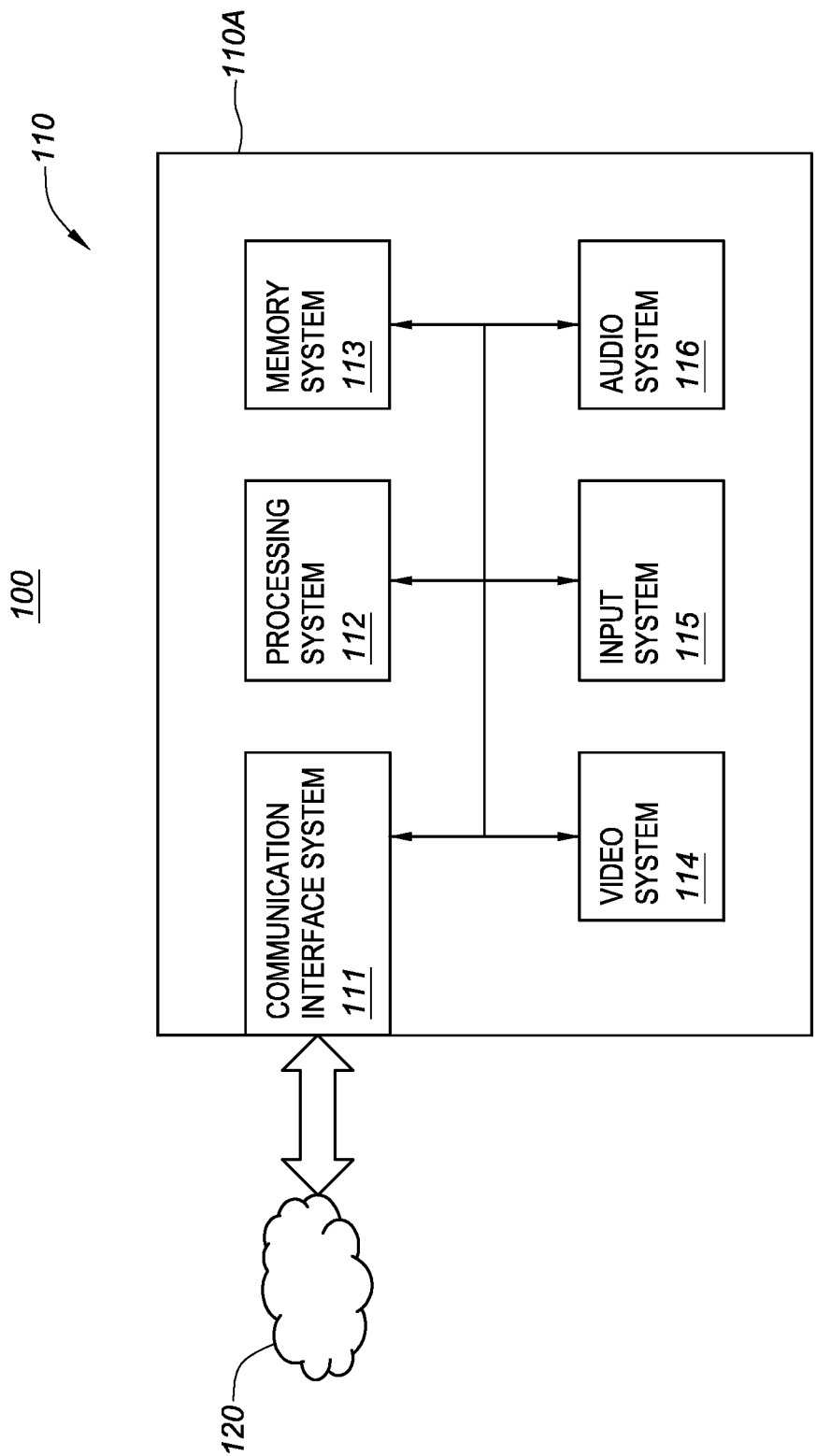
FIG. 2A is a top-level block diagram illustrating an exemplary embodiment of a first participant computer system for use with the video conference system of FIG. 1.

An exemplary embodiment of the first participant computer system 110A is shown in FIG. 2A. The first participant computer system 110A is illustrated as including a includes a communication interface system (or circuit) 111 for facilitating communication between the first participant computer system 110A and the communication network 120. Stated somewhat differently, the first participant computer system 110A can communicate with the other participant computer systems 110 (shown in FIG. 1) via the communication interface system 111. The first participant computer system 110A and the communication network 120 can be configured to communicate in any suitable manner. Preferably, the communication interface system 111 is configured to support high-speed wired and/or wireless data communications between the first participant computer system 110A and the other participant computer systems 110. The first participant computer system 110A thereby can exchange communication content with the other participant computer systems 110.

As shown in FIG. 2A, the first participant computer system 110A can include a video system (or circuit) 114 and an audio system (or circuit) 116 that can be controlled via a processing system (or circuit) 112. In selected embodiments, the video system 114 and/or the audio system 116 can be separate from, or at least partially integrated with, the processing system 112. The processing system 112 can comprise any appropriate number and type of suitable processing systems, such as one or more microprocessors (μPs), one or more central processing units (CPUs), one or more digital signal processors (DSPs), and/or one or more coder/decoders (CODECs). The processing system 112 can be configured to process incoming communication content received from the other participant computer systems 110 in a suitable manner and to provide a video portion of the incoming communication content to the video system 114 for visual presentation and/or an audio portion of the incoming communication content to the audio system 116 for audible presentation. Additionally and/or alternatively, the processing system 112 can be configured to process outgoing communication content generated by the video system 114 and/or the audio system 116 in a suitable manner for transmission to the other participant computer systems 110 for presentation.

The first participant computer system 110A is shown as including a memory system (or circuit) 113. Being coupled with the processing system 112, the memory system 113 preferably is configured for storing and providing other conventional types of information, including instruction code, such as software or firmware, intermediate calculation results, and other information associated with the processing system 112. The memory system 113 optionally can provide at least temporary storage of the communication content. In selected embodiments, the memory system 113 can comprise any conventional type of memory system, such as any suitable electronic, magnetic, and/or optical storage media, without limitation. Exemplary storage media can include one or more static random access memories (SRAMs), dynamic random access memories (DRAMs), electrically-erasable programmable read-only memories (EEPROMs), FLASH memories, hard drives (HDDs), compact disks (CDs), and/or digital video disks (DVDs) of any kind. The communication content received from the other participant computer systems 110 thereby can advantageously be buffered when the communication content is streamed to the first participant computer system 110A and/or can be stored for subsequent presentation, regardless of whether communication with the other participant computer systems 110 is maintained.

As shown in FIG. 2A, the first participant computer system 110A can include a user interface input system (or circuit) 115 for permitting the first conference participant 500A (shown in FIG. 1) to communicate with the first participant computer system 110A. For example, the user interface input system 115 can permit the first conference participant 500A to enter one or more instructions for controlling operation of the first participant computer system 110A. Illustrative instructions can include instructions for initiating (or terminating) a video conference, instructions for controlling presentation of the incoming communication content via the video system 114 and/or the audio system 116, and/or instructions for controlling the outgoing communication content generated by the video system 114 and/or the audio system 116, without limitation. The user interface input system 115 can be provided in any conventional manner and, in selected embodiments, can include one or more switches (or pushbuttons), such as a keyboard or a keypad, and/or a pointing device, such as a mouse, trackball, or stylus. As desired, the user interface input system 115 can be at least partially integrated with, and/or separable from, the first participant computer system 110A.

Figure 2B:
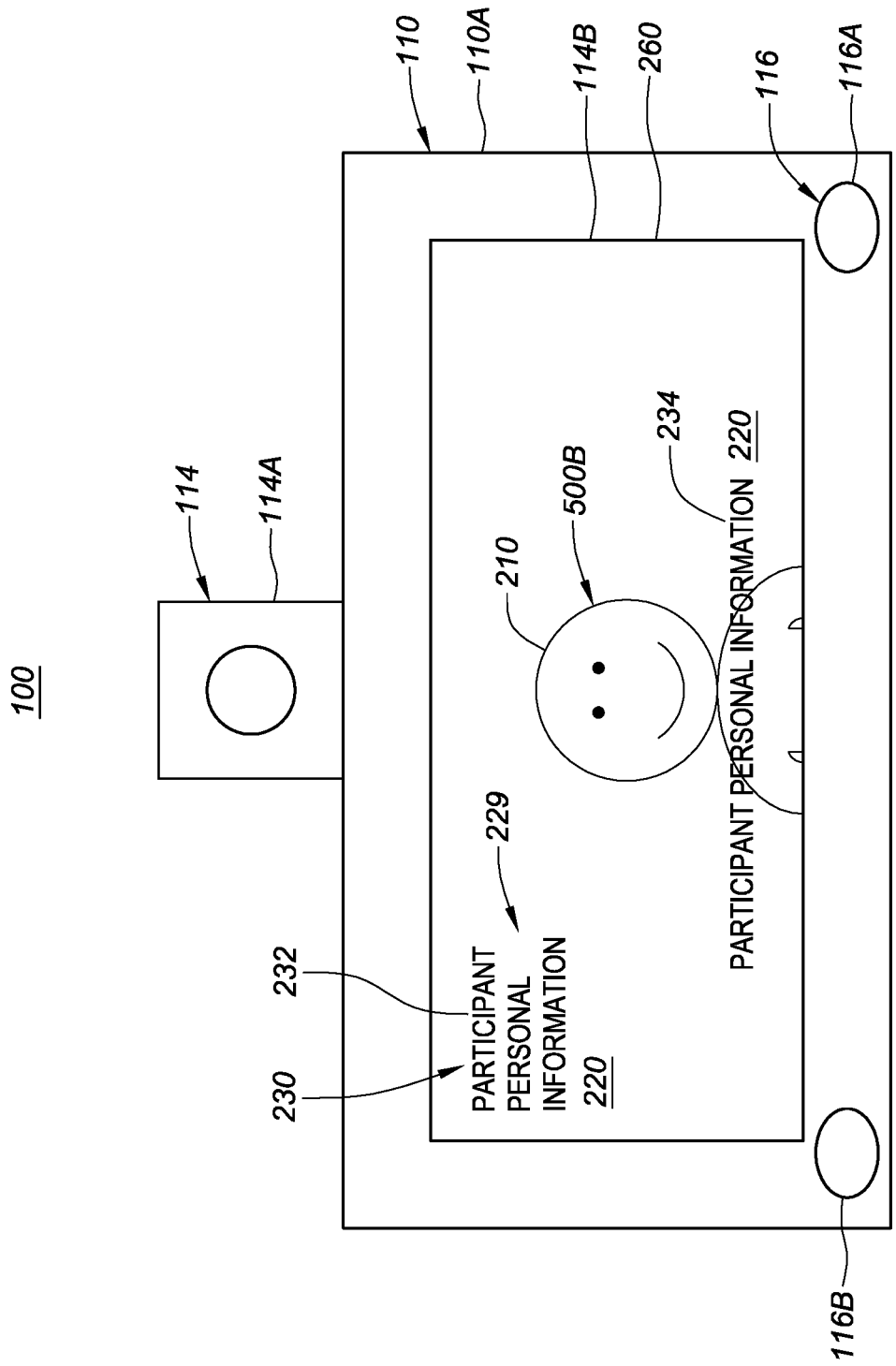
FIG. 2B is block diagram illustrating an alternative exemplary embodiment of the first participant computer system of FIG. 2A, wherein the first participant computer system includes a video display system for presenting the virtual stage.

During a video conference, the video conference system 100 can enable the video conference participants 500 (shown in FIG. 1) to communicate via the participant computer systems 110. As illustrated in FIG. 2B, the video system 114 of the first participant computer system 110A can comprise a video camera system (or circuit) 114A and/or a video display system (or circuit) 114B; whereas, the audio system 116 can include a microphone system (or circuit) 116A and/or a speaker system (or circuit) 116B. The video camera system 114A of the first participant computer system 110A, for example, can be activated to capture at least one still and/or moving visual image of the first conference participant 500A (shown in FIG. 1), and the microphone system 116A can activated to capture any words spoken by the first conference participant 500A and other sound within a first operating environment of the first participant computer system 110A.

The video display system 114B can visually present at least one still and/or moving visual image 210 of the second conference participant 500B and/or at least one still and/or moving visual image 210 of any other conference participants 500 (shown in FIG. 1) in the video conference; whereas, the speaker system 116B can audibly present any words spoken by the second conference participant 500B and other sound within a second operating environment of the second participant computer system 110B. In selected embodiments, the video camera system 114A, the microphone system 116A, the video display system 114B and/or the speaker system 116B can be activated or otherwise controlled via the user interface input system 115 (shown in FIG. 2A).

The processing system 112 can process visual image and audio data received from the video camera system 114A and the microphone system 116A of the first participant computer system 110A as well as visual image and audio data received from the other participant computer systems 110. Stated somewhat differently, the processing system 112 can control a manner by which the visual images of the first conference participant 500A and/or the words spoken by the first conference participant 500A and other sounds within the first operating environment are captured by the video camera system 114A and/or the microphone system 116A, respectively. The processing system 112 likewise can control a manner by which the visual images of the second conference participant 500B and/or the words spoken by the second conference participant 500B and other sounds within the second operating environment are respectively presented via the video display system 114B and/or the speaker system 116B.

Advantageously, the processing system 112 likewise can enable the video display system 114B to present participant personal information 220 associated with the second conference participant 500B. The video display system 114B, for example, can present the participant personal information 220 as part of a virtual stage 230 for the visual image 210 of the second conference participant 500B. Stated somewhat differently, the participant personal information 220 can comprise the virtual stage 230 for the visual image 210 and/or can be combined with one or more other visible elements, such as an image of a bookcase or a nature scene, to form the virtual stage 230.

The virtual stage 230 can be provided with any suitable size and/or shape and/or can be defined by a boundary or other periphery 260. In selected embodiments, the first virtual stage 230A can defined with a rectangular shape and can be sized for visual presentation via the video display system 114B (shown in FIG. 2A) of the second participant computer system 110B. Additionally and/or alternatively, the participant personal information 220 can be superimposed with an image of the operating environment of the second participant computer system 110B associated with the second conference participant 500B. The virtual stage 230, in selected embodiments, can include participant personal information 220 associated with the second conference participant 500B and/or participant personal information 220 associated with one or more of the other conference participants 500.

The virtual stage 230 optionally can comprise a virtual background 232 for presentation behind the visual image 210 and/or a virtual foreground 234 for presentation in front of the visual image 210. The visual image 210, in other words, can be shown as being disposed between the virtual background 232 and the virtual foreground 234. In selected embodiments, the video display system 114B can present the visual image 210 and can superimpose the presented visual image 210 and the virtual stage 230. Stated somewhat differently, the visual image 210 can be superimposed upon the virtual background 232, the virtual foreground 234 can be superimposed upon the visual image 210, or both. The virtual stage 230 optionally can comprise a virtual business card of the second conference participant 500B.

In selected embodiments, the virtual stage 230 advantageously can comprise a context-dependent, auto-generated virtual background 232 and/or a context-dependent, auto-generated virtual foreground 234. If the first conference participant 500A is associated with a selected company or other organization, for example, the video conference system 100 can automatically add an organization name, an organization logo and/or other organization indicia associated with the selected organization to the virtual stage 230 of the second conference participant 500B for presentation during the video conference with the first conference participant 500A. Logic for adding the organization indicia to the virtual stage 230 of the second conference participant 500B can be include in a frontend logic system (not shown) and/or a backend logic system (not shown) of a HyperText Markup Language (HTML5) canvas and preferably is hidden to help ensure that the first conference participant 500A and the second conference participant 500B do not see the specific logic on how the organization indicia is disposed on the virtual stage 230 of the second conference participant 500B.

In selected embodiments, one or more items 229 of participant personal information 220 can be associated with the second conference participant 500B. The items 229 of participant personal information 220 associated with the second conference participant 500B, for example, can be pulled or otherwise received from an optional database 130 (shown in FIG. 1), one or more external data resources or any other available source of participant data. At least one item 229 of participant personal information 220 can be manually entered or otherwise provided by the second conference participant 500B.

An exemplary database 130 for providing selected items 229 of participant personal information 220 associated with the second conference participant 500B can include, but is not limited to, a participant profile database 132 as shown in FIG. 1. The participant profile database 132 can be configured to store the available items 229 of participant personal information 220 as raw image data. The raw image data can be stored in any suitable format such as a base 64 format, a bit map format, a Portable Graphics Format (or png) file, Joint Photographic Experts Group (or jpg) file. To help ensure security of the stored data, the participant profile database 132 can store the stored items 229 of participant personal information 220 and/or the virtual stage 230 with a unique security code, such as a multi-digit alphanumeric character sequence. The video conference system 100 can include uploading the stored image data to a cloud-based image and video management service, such as the Cloudinary platform available via Cloudinary in Santa Clara, California.

The cloud-based image and video management service can return a hosted Uniform Resource Locator (URL), which can be download and/or provided to a videoconferencing platform, such as Zoom Cloud Meetings available from Zoom Video Communications, Inc., in San Jose, California. Selected videoconferencing platforms can support an ability to have a virtual foreground 234, which allows for image generation/creation to exist in front of the visual image 210 of the second conference participant 500B and/or any other conference participants 500 in addition (and/or alternatively) to presenting the virtual background 232 behind the visual image 210. The video conference system 100 advantageously can display information uniquely on the virtual background 232 and the virtual foreground 234, thereby enveloping a video stream of the second conference participant 500B and/or any other conference participants 500 with custom text and other information.

In selected embodiments, the video conference system 100 can store each image URL so that unique images can be made available for each virtual background 232 and/or each virtual foreground 234. The video conference system 100 advantageously can be fully scalable because the stored items 229 of participant personal information 220 preferably are not stored in the participant profile database 132 on a long-term basis. The stored items 229 of participant personal information 220 instead can be stored in browsers of the conference participants 500 when their pages load. The video conference system 100 optionally can include a compression setting for enabling the conference participants 500 to reduce image quality in exchange for speeding up image creation. Additionally and/or alternative, the video conference system 100 can support increasing text size based on internet speed. If one of the conference participants 500 has a bad internet connection, for example, the video conference system 100 can detect the bad internet connection and create a virtual background 232 and/or a virtual foreground 234 with larger text and/or images depending on the items 229 of participant personal information 220 and other information that is being displayed.

The participant profile database 132 can be at least partially integrated with, and/or separate from, the second participant computer system 110B. The participant profile database 132 preferably includes participant personal information 220 for each conference participant 500 in the video conference and/or can communicate with the second participant computer system 110B directly and/or indirectly via the communication network 120 as shown in FIG. 1.

Exemplary items 229 of participant personal information 220 for the second conference participant 500B can include a participant name 221 (shown in FIG. 3B), participant title information 222 (shown in FIG. 3B), a participant logo 223 (shown in FIG. 3B), participant pronoun preference information 224 (shown in FIG. 3A), participant name pronunciation information 225 (shown in FIG. 3A), participant geographical location information 226 (shown in FIG. 3B), at least one item 229 of personal interest (or trivia) information 227 (shown in FIG. 3B), participant image indicia, participant contact information, and/or participant biographical, participant demographic, participant occasion information and/or any other personal information associated with the second conference participant 500B, without limitation. The participant geographical location information 226 optionally can include current time and date information for the geographical location associated with the second conference participant 500B.

The participant occasion information can include, but is not limited to, information about any birthdate, wedding anniversary, a graduation event or any other periodic or intermittent special occasion associated with the second conference participant 500B. The items 229 of the participant personal information 220 disposed on the virtual stage 230 can be static and/or dynamic over time. Stated somewhat differently, the number and/or selection of the items 229 of participant personal information 220 selected for the virtual stage 230 can be fixed and/or can change during the video conference.

In selected embodiments, the number, type and/or nature of the items 229 of the participant personal information 220 disposed on the virtual stage 230 can be limited based upon privacy or other issues. Inclusion of any personally identifiable information (or PII) on the virtual stage 230, for example, can be limited based upon a relationship among the conference participants 500. Additionally and/or alternatively, the items 229 of the participant personal information 220 disposed on the virtual stage 230 can be limited when the video conference includes two or more conference participants 500 who have never before met. The items 229 of the participant personal information 220 disposed on the virtual stage 230 optionally can be limited based upon the participant geographical location information 226 associated with the conference participants 500. For instance, the laws of certain countries may prohibit dissemination of personally identifiable information or other predetermined types of participant personal information 220.

The participant personal information 220 can be disposed at any suitable position on the virtual stage 230. For example, some or all of the participant personal information 220 can be disposed at suitable position(s) on the virtual background 232 and/or some or all of the participant personal information 220 can be disposed at suitable position(s) on the virtual foreground 234. The position of the participant personal information 220 on the virtual stage 230 can be static and/or dynamic over time. The participant personal information 220 thereby can be disposed at a fixed position and/or can change position on the virtual stage 230 during the video conference. In selected embodiments, the participant personal information 220 can be disposed on the virtual stage 230 relative to the visual image 210 of the second conference participant 500B.

In other words, the participant personal information 220 associated with the virtual background 232 can be disposed above the visual image 210 of the second conference participant 500B, below the visual image 210, to the left of the visual image 210 and/or to the right of the visual image 210. Additionally and/or alternatively, the participant personal information 220 associated with the virtual foreground 234 can be disposed above the visual image 210 of the second conference participant 500B, below the visual image 210, to the left of the visual image 210, to the right of the visual image 210 and/or can at least partially overlap with the visual image 210. If the participant personal information 220 includes more than one item 229 of participant personal information 220, the items 229 of participant personal information 220 can be distributed at respective preselected positions on the virtual stage 230.

Each item 229 of participant personal information 220 disposed on the virtual stage 230 preferably is rendered as a Full High Definition (or 1080p) image in an effort to limit or otherwise avoid blurriness. In selected embodiments, the video conference system 100 can include blurring image detection for checking the items 229 disposed on the virtual stage 230 for any blurriness and to help ensure that the items 229 are sharp and work for multiple backgrounds, foregrounds, sizes and/or shapes. The video conference system 100 optionally can determine which font(s) and/or color(s) look best on different foregrounds and/or backgrounds for a text and/or image overlay dependent on the foreground and/or background image. For example, if a background image is visually presented all white, the text and/or image overlay can be visually presented in purple. In other word, the text and/or image overlay associated with the items 229 of participant personal information 220 can be visually presented in a dominant color relative to the background image.

Although shown and described with reference to FIG. 2B as presenting the visual image 210 of the second conference participant 500B with a virtual stage 230 with the participant personal information 220 associated with the second conference participant 500B for purposes of illustration only, the video display system 114B can be configured to present a visual image 210 and a virtual stage 230 with participant personal information 220 for any suitable number of conference participants 500. The video display system 114B, for example, can present a visual image 210 and a virtual stage 230 with participant personal information 220 for each of the other conference participants 500 in the video conference.

The video display system 114B preferably presents an enlarged or otherwise enhanced visual image 210 and a virtual stage 230 with participant personal information 220 for at a first speaking conference participant 500 while the first speaking conference participant 500 speaks the during the video conference. When a second speaking conference participant 500 begins to speak during the video conference, the video display system 114B can present an enlarged or otherwise enhanced visual image 210 and a virtual stage 230 with participant personal information 220 for the second speaking conference participant 500. As desired, the visual images 210 and the virtual stages 230 for the first and second speaking conference participants 500 can be simultaneously presented via the video display system 114B during the video conference. In selected embodiments, the video display system 114B of the of the first participant computer system 110A can be configured to present a visual image 210 and a virtual stage 230 with participant personal information 220 for two or more second conference participants 500B associated with the second participant computer system 110B.

In selected embodiments, the visual image 210 and the virtual stage 230 with participant personal information 220 for the second conference participant 500B can be presented on the video display system 114B in combination with (or simultaneously with) the visual image 210 and the virtual stage 230 with participant personal information 220 associated with one or more of the other conference participants 500B. Additionally and/or alternatively, the visual image 210 and the virtual stage 230 with participant personal information 220 for the second conference participant 500B and the visual image 210 and the virtual stage 230 with participant personal information 220 associated with one or more of the other conference participants 500B can be alternately (or sequentially) presented on the video display system 114B.

Although comprising uniform and/or different computer systems, each of the participant computer systems 110 preferably include the features and functionality shown and described with reference to the first participant computer system 110A of FIGS. 2A-B. Each of the participant computer systems 110, for example, can include a video system 114 and/or an audio system 116 that can be controlled via one or more processing system 112. The video system 114 can be activated to capture at least one still and/or moving visual image of the conference participant 500 associated with the participant computer system 110; whereas, the audio system 116 can be activated to capture any words spoken by the conference participant 500 and other sound within an operating environment of the participant computer system 110.

Additionally and/or alternatively, the video system 114 can be activated to visually present at least one still and/or moving visual image 210 of one or more other conference participants 500 in the video conference, and/or the audio system 116 can be activated to audibly present any words spoken by the other conference participants 500 and other sound within the respective operating environments of the other participant computer systems 110. In selected embodiments, the video camera system 114A, the microphone system 116A, the video display system 114B and/or the speaker system 116B can be activated or otherwise controlled via the user interface input system 115 (shown in FIG. 2A). The video system 114 advantageously can be configured to present participant personal information 220 associated with at least one of the other conference participants 500 as a virtual stage 230 for the visual image(s) 210 of the relevant other conference participants 500.

Figure 3A:
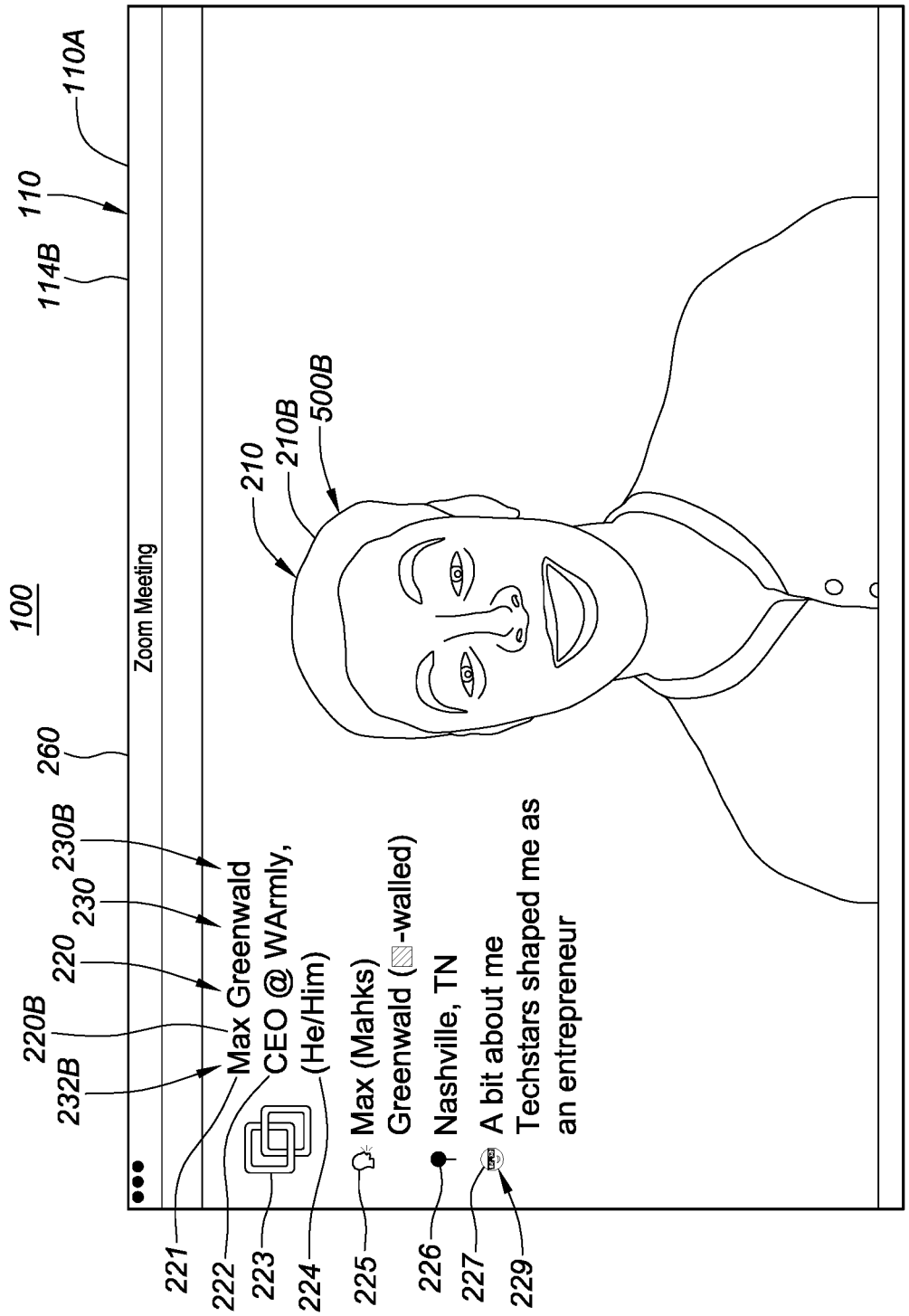
FIG. 3A is detail diagram illustrating an exemplary embodiment of the first participant computer system of FIGS. 2A-B for presenting a second virtual stage with participant personal information associated with a second video conference participant associated with a second participant computer system.
Figure 3B:
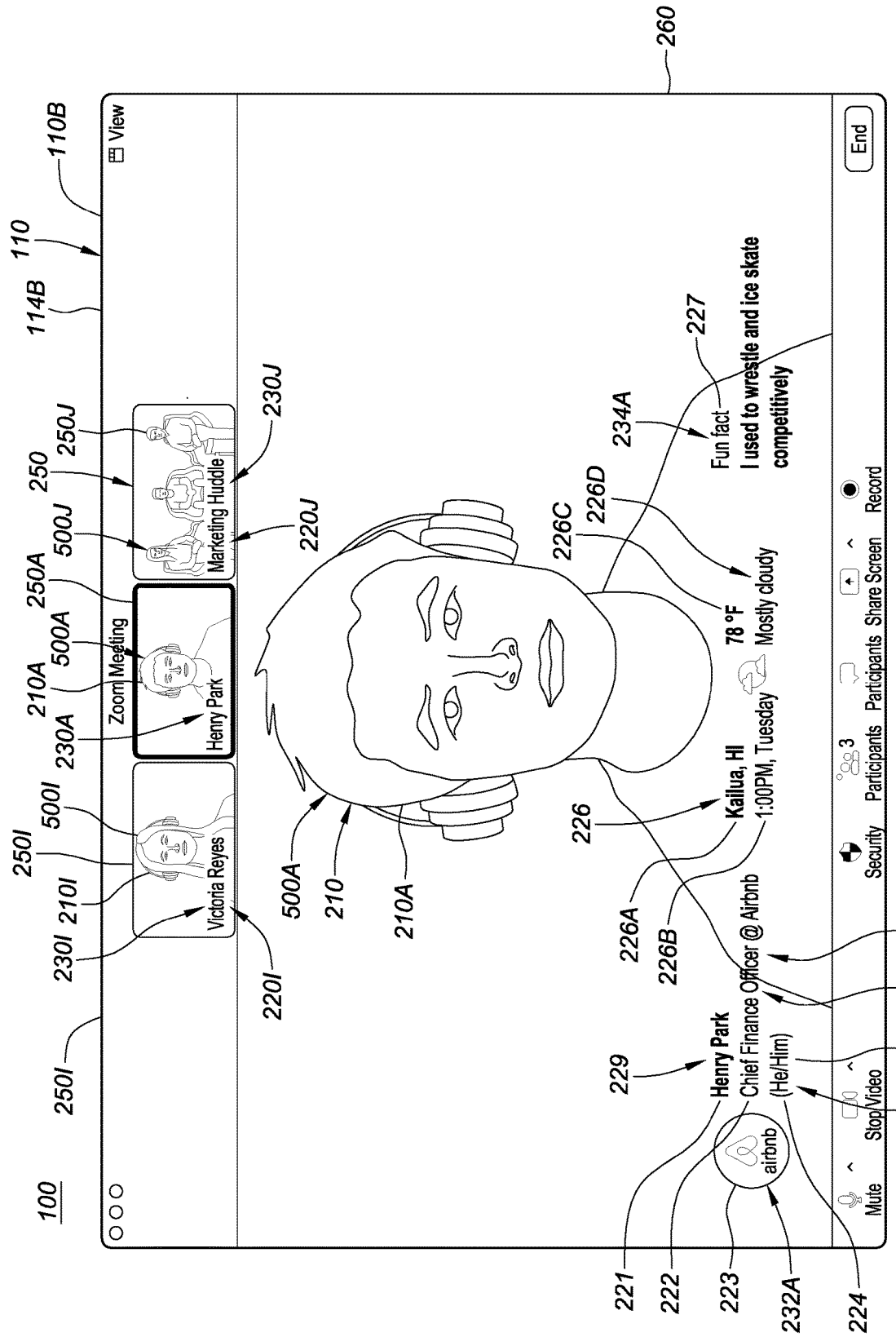
FIG. 3B is detail diagram illustrating an exemplary embodiment of the second participant computer system of FIG. 3A, wherein the second participant computer system presents a first virtual stage with participant personal information associated with a first video conference participant associated with the first participant computer system.
Figure 3C:
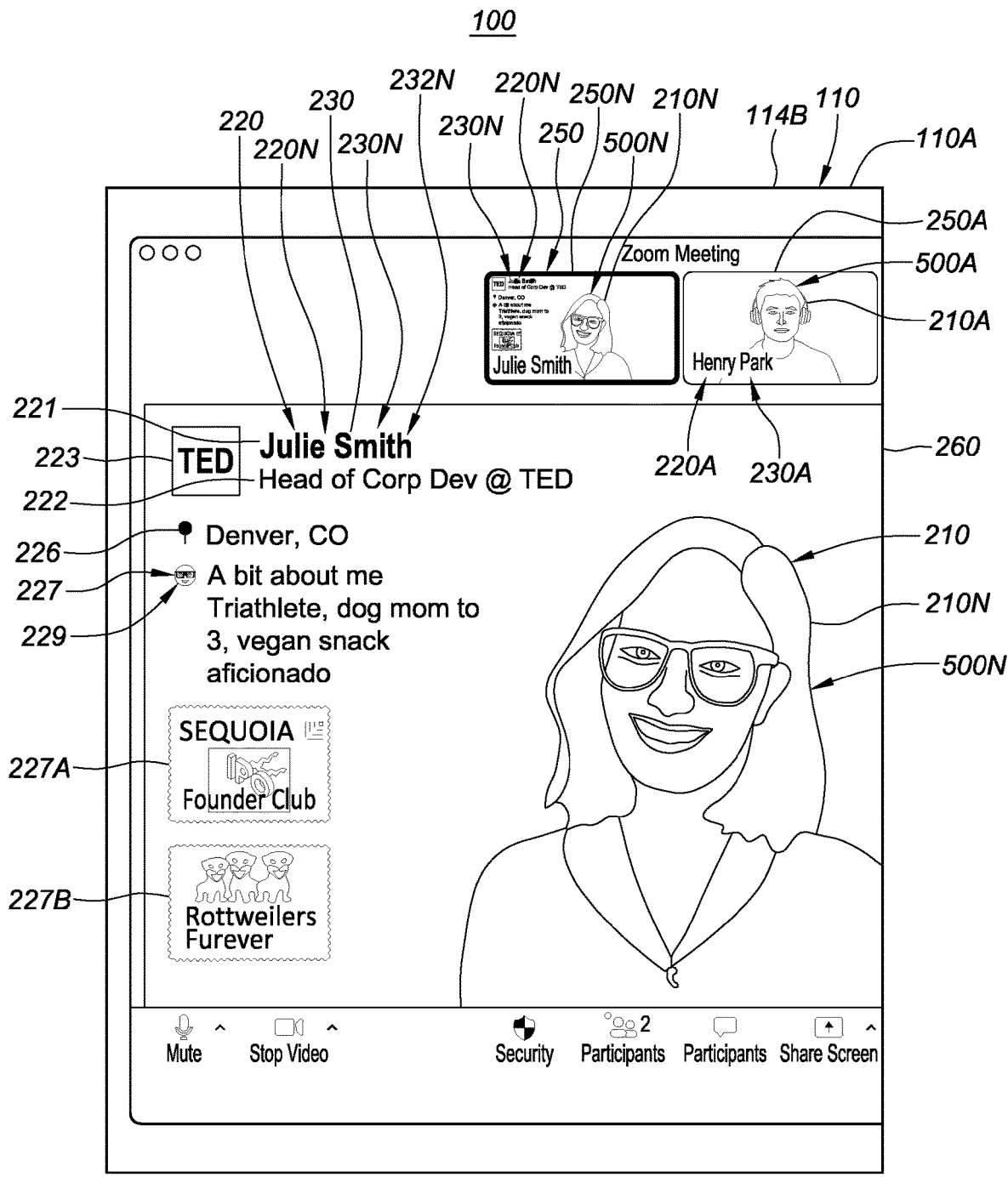
FIG. 3C is detail diagram illustrating an alternative exemplary embodiment of the first participant computer system of FIG. 3A, wherein the first participant computer system presents the first virtual stage associated with the first video conference participant and an Nth virtual stage with participant personal information associated with an Nth video conference participant. associated with an Nth participant computer system.

Exemplary participant computer systems 110 for presenting visual images 210 of one or more selected conference participants 500 superimposed with respective virtual stages 230 during the video conference are shown in FIGS. 3A-C. FIG. 3A, for example, illustrates the first participant computer system 110A associated with the first conference participant 500A (shown in FIG. 1). Turning to FIG. 3A, the video display system 114B of the first participant computer system 110A is illustrated as presenting a second visual image 210B of the second conference participant 500B with second participant personal information 220B associated with the second conference participant 500B. The second participant personal information 220B can be included in a second virtual stage 230B for the second visual image 210B of the second conference participant 500B. The second virtual stage 230B of FIG. 3A includes a second virtual background 232B. The second virtual stage 230B (or the second virtual background 232B) optionally can include one or more other visible elements (not shown), as desired.

As shown in FIG. 3A, the second participant personal information 220B can comprise a participant name 221 of the second conference participant 500B. The second participant personal information 220B optionally can include participant title information 222, a participant logo 223, participant pronoun preference information 224 and/or participant name pronunciation information 225 associated with the second conference participant 500B. Additionally and/or alternatively, participant geographical location information 226 and/or at least one item 229 of personal interest (or trivia) information 227 associated with the second conference participant 500B can be included among the second participant personal information 220B. In selected embodiments, the second participant personal information 220B can include participant image indicia, participant contact information, and/or participant biographical, demographic and/or other personal information associated with the second conference participant 500B.

An exemplary embodiment of the second participant computer system 110B associated with the second conference participant 500B (shown in FIG. 1) is illustrated in FIG. 3B. Turning to FIG. 3B, the video display system 114B of the second participant computer system 110B is illustrated as presenting a first visual image 210A of the first conference participant 500A with first participant personal information 220A associated with the first conference participant 500A. The first participant personal information 220A can be included in a first virtual stage 230A for the first visual image 210A as shown in FIG. 3B. The first virtual stage 230A optionally can include one or more other visible elements (not shown), as desired.

As illustrated in FIG. 3B, the first participant personal information 220A can comprise a participant name 221 of the first conference participant 500A. The first participant personal information 220A optionally can include participant title information 222, a participant logo 223 and/or participant pronoun preference information 224 associated with the first conference participant 500A. Additionally and/or alternatively, participant geographical location information 226 and/or at least one item 229 of personal interest (or trivia) information 227 associated with the first conference participant 500A can be included among the first participant personal information 220A. As shown in FIG. 3B, the participant geographical location information 226 can include, but is not limited to, city and state information 226A, current date and time information 226B, current temperature information 226C and/or current weather information 226D at the second operating environment of the second participant computer system 110B or other geographical region associated with the first conference participant 500A. The first participant personal information 220A, in selected embodiments, can include participant image indicia, participant contact information, and/or participant biographical, demographic and/or other personal information associated with the first conference participant 500A.

The first virtual stage 230A of FIG. 3B includes a first virtual background 232A and a first virtual foreground 234A. The first participant personal information 220A disposed on the first virtual background 232A includes the participant logo 223. The participant geographical location information 226 and the personal interest (or trivia) information 227 associated with the first conference participant 500A are shown as being disposed on the first virtual foreground 234A and in front of the first visual image 210A.

In the manner set forth above with reference to FIG. 2B, the second participant computer system 110B can be configured to present visual images 210 with virtual stages 230 with respective participant personal information 220 for any suitable number of conference participants 500. The video display system 114B, for example, can present a visual image 210 and a virtual stage 230 with participant personal information 220 for each of the other conference participants 500 in the video conference. In selected embodiments, the second participant computer system 110B can define an individual display pane (or window) 250 for displaying the present visual image 210 and virtual stage 230 with the participant personal information 220 for each conference participant 500. The display windows 250 can be defined with uniform and/or different sizes.

As illustrated in FIG. 3B, for example, the second participant computer system 110B can define a first display window 250A for presenting the first visual image 210A of the first conference participant 500A with the first participant personal information 220A associated with the first conference participant 500A. The second participant computer system 110B optionally can define an Ith display window 250I for presenting an Ith visual image 210I of an Ith conference participant 500I with Ith participant personal information 220I associated with the Ith conference participant 500I and/or a Jth display window 250J for presenting a Jth visual image 210I of one or more Jth conference participants 500J with Jth participant personal information 220J associated with at least one of the Jth conference participants 500J. The second participant computer system 110B thereby can present the visual images 210 and the virtual stages 230 with the participant personal information 220 for each of the shown conference participants 500.

An alternative exemplary embodiment of the first participant computer system 110A is shown in FIG. 3C. As illustrated in FIG. 3C, the video display system 114B of the first participant computer system 110A can present an Nth visual image 210N of the Nth conference participant 500N with Nth participant personal information 220N associated with the Nth conference participant 500N. The Nth participant personal information 220N can be included in a Nth virtual stage 230N for the Nth visual image 210N of the Nth conference participant 500N. The Nth virtual stage 230N of FIG. 3C includes an Nth virtual background 232N. The Nth virtual stage 230N (or the Nth virtual background 232N) optionally can include one or more other visible elements (not shown), as desired.

As illustrated in FIG. 3C, the Nth participant personal information 220N can comprise a participant name 221 of the Nth conference participant 500N. The Nth participant personal information 220N optionally can include participant title information 222 and/or a participant logo 223 associated with the Nth conference participant 500N. Additionally and/or alternatively, participant geographical location information 226 and/or at least one item 229 of personal interest (or trivia) information 227 associated with the Nth conference participant SOON can be included among the Nth participant personal information 220N. The personal interest (or trivia) information 227 can include text and other personal interest indicia 227A, 227B for identifying or otherwise explaining one or more personal interests of the first conference participant 500A, without limitation. The Nth participant personal information 220N, in selected embodiments, can include participant image indicia, participant contact information, and/or participant biographical, demographic and/or other personal information associated with the Nth conference participant SOON.

In the manner set forth above with reference to FIG. 3B, the first participant computer system 110A can be configured to present visual images 210 with virtual stages 230 with participant personal information 220 for any suitable number of conference participants 500. The video display system 114B, for example, can define an individual display window 250 for presenting a visual image 210 and a virtual stage 230 with the participant personal information 220 for each conference participant 500. As illustrated in FIG. 3C, for example, the first participant computer system 110A can define a first display window 250A for presenting the first visual image 210A of the first conference participant 500A with the first participant personal information 220A associated with the first conference participant 500A and/or an Nth display window 250N for presenting the Nth visual image 210N of the Nth conference participant 500N with the Nth participant personal information 220N associated with the Nth conference participant 500N. The first participant computer system 110A thereby can present the visual images 210 and the virtual stages 230 with the participant personal information 220 for the first conference participant 500A and the other conference participant 500 in selected embodiments.

Figure 4:
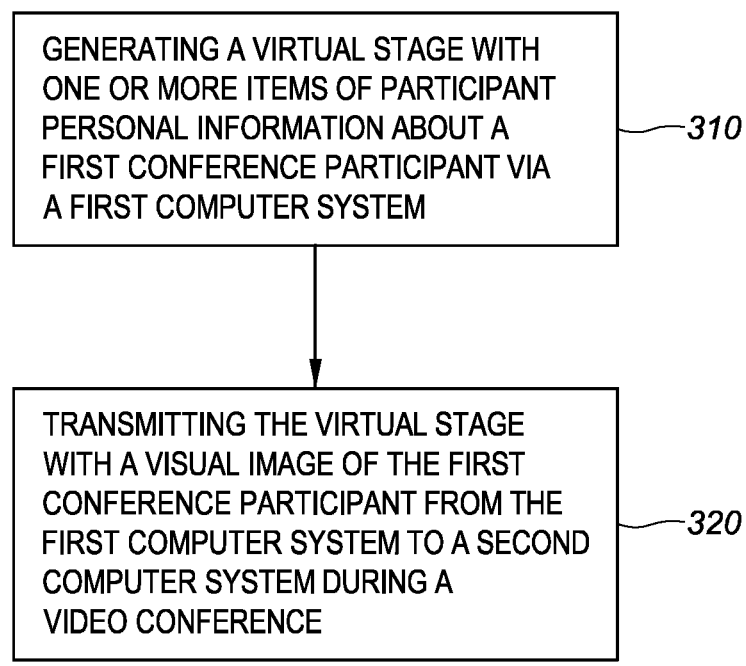
FIG. 4 is a top-level flow chart diagram illustrating an exemplary embodiment of a video conference method for generating and transmitting the virtual stage with the participant personal information of FIG. 1.

In operation, the video conference system 100 can generate and transmit the virtual stage 230 with the participant personal information 220 in any suitable manner. An exemplary method 300 for generating and transmitting the first virtual stage 230A with the first participant personal information 220A associated with the first conference participant 500A is shown in FIG. 4 with reference to FIGS. 1 and 2A-B. Turning to FIG. 4, the method 300 can include, at 310, generating the first virtual stage 230A with one or more items 229 of the first participant personal information 220A about, describing or otherwise associated with the first conference participant 500A. The first virtual stage 230A for the first conference participant 500A, for example, can be generated via the first participant computer system 110A associated with the first conference participant 500A in the manner discussed in more detail above with reference to FIG. 2B. The first virtual stage 230A can be generated automatically and/or manually by the first conference participant 500A, another conference participant 500 or other user.

The method 300 can include, at 320, transmitting the first virtual stage 230A for the first conference participant 500A from the first participant computer system 110A to the second participant computer system 110B associated with the second conference participant 500B and/or one or more other participant computer systems 110 associated with the other conference participants 500. The first visual image 210A of the first conference participant 500A, for example, can be transmitted with the first virtual stage 230A from the first participant computer system 110A to the second participant computer system 110B in the manner discussed above with reference to FIG. 2B. The first participant computer system 110A can transmit the first visual image 210A and the first virtual stage 230A associated with the first conference participant 500A to the second participant computer system 110B, for example, during the video conference.

Figure 5A:
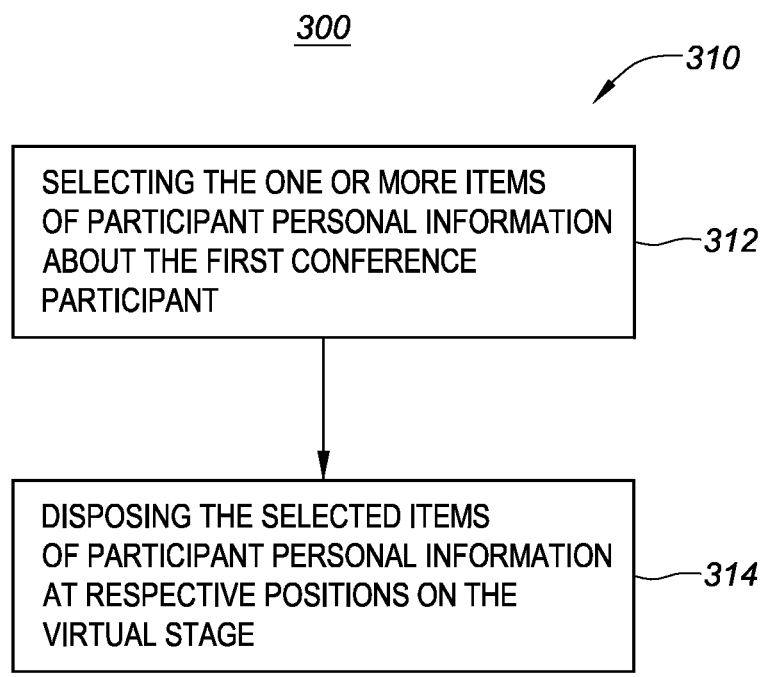
FIG. 5A is a top-level flow chart diagram illustrating an exemplary embodiment of the method of FIG. 4, wherein the method includes selecting the participant personal information for the first video conference participant and positioning the selected participant personal information on the virtual stage.

Turning to FIG. 5A, the method 300 is shown as generating the first virtual stage 230A, at 310, by selecting the one or more items 229 of the first participant personal information 220A associated with the first conference participant 500A, at 312. The items 229 of the first participant personal information 220A associated with the first conference participant 500A, for example, can be pulled or otherwise received from the database 130 (shown in FIG. 1), one or more external data resources or any other available source of participant data. In selected embodiments, at least one item 229 of the first participant personal information 220A can be manually entered or otherwise provided by the first conference participant 500A, another conference participant 500 or other user.

The method 300 of FIG. 5A also can include positioning the selected items 229 of the first participant personal information 220A at respective positions on the first virtual stage 230A, at 314. Stated somewhat differently, the selected items 229 of the first participant personal information 220A can be combined or otherwise disposed in a predetermined arrangement or configuration to form the first virtual stage 230A. The method 300 optionally can include defining a boundary or other periphery 260 (shown in FIG. 2B) of the first virtual stage 230A. In selected embodiments, positioning the selected items 229 of the first participant personal information 220A, at 314, thereby can comprise positioning the selected items 229 of the first participant personal information 220A at respective positions within the periphery 260 of the first virtual stage 230A. The first virtual stage 230A can defined with any suitable size and/or shape. In selected embodiments, the first virtual stage 230A can defined with a rectangular shape and can be sized for visual presentation via the video display system 114B (shown in FIG. 2A) of the second participant computer system 110B.

Positioning the selected items 229 of the first participant personal information 220A at respective positions on the first virtual stage 230A, at 314, can include disposing at least one of the selected items 229 of the first participant personal information 220A at respective position(s) on the virtual background 232 and/or disposing at least one of the selected items 229 of the first participant personal information 220A at respective position(s) on the virtual foreground 234. In selected embodiments, a selected item 229 of the first participant personal information 220A can be disposed on both the virtual background 232 and the virtual foreground 234.

The selected items 229 of the first participant personal information 220A disposed on the virtual foreground 234 preferably are positioned so as to avoid obscuring the selected items 229 disposed on the virtual background 232 during presentation via the second participant computer system 110B and/or one or more other participant computer systems 110 associated with the other conference participant 500. As desired, the selected items 229 optionally can be disposed on the virtual foreground 234 so as to avoid overlap with the first visual image 210A of the first conference participant 500A and/or can be permitted to at least partially overlay the first visual image 210A of the first conference participant 500A during presentation. Additionally and/or alternatively, the selected items 229 disposed on the virtual background 232 can be positioned so as to avoid being obscured by the first visual image 210A of the first conference participant 500A and/or the selected items 229 disposed on the virtual foreground 234 during presentation.

Figure 5B:
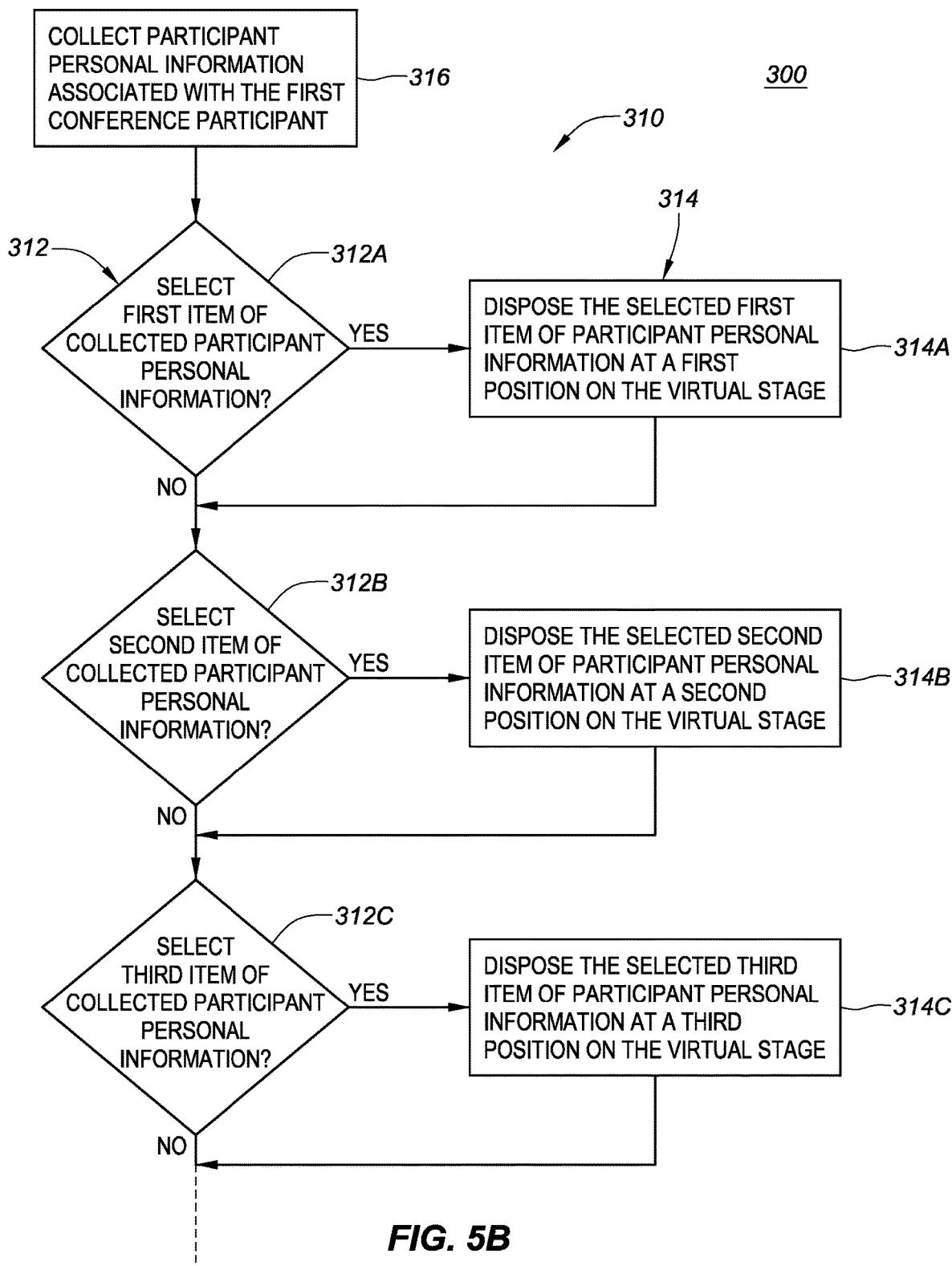
FIG. 5B is a detailed flow chart diagram illustrating an exemplary alternative embodiment of the method of FIG. 5A, wherein the method includes collecting participant personal information for the first video conference participant.

Turning to FIG. 5B, generating the first virtual stage 230A, at 310, of the method 300 can include, at 316, collecting the first participant personal information 220A for the first conference participant 500A. The first participant personal information 220A can be automatically and/or manually collected. In selected embodiments, the first participant personal information 220A can be collected, and optionally enriched, via one or more external data resources, including the following exemplary data resources, without limitation:

Timezone—Google location Application Programming Interface (or API);
Weather data—weather APIs;
Audio-based pronunciations: partner NameCoach's API;
Calendar data: for mutual connections of the first conference participant 500A, knowing which people that the first conference participant 500A has not yet met;
Enrichment=clearbit API;
Email data=Google email API;
CRM data=SFDC/Hubspot integrations;
Browser information=location, device size, etc.; and/or
News on companies=crunchbase API and/or clearbit API.

In selected embodiments, the collected items 229 of the first participant personal information 220A can include at least one item 229 of the first participant personal information 220A entered by the first conference participant 500A, another conference participant 500 or other user. Stated somewhat differently, the conference participants 500 can enrich their own the first participant personal information 220A by entering at least one instance of participant-entered data. An exemplary instance of participant-entered data can comprise a participant statement such as "I like cats." The collected items of the first participant personal information 220A, including the enriched items of the first participant personal information 220A, the data from the external data resources, and the participant-entered data can be stored as stored items of the first participant personal information 220A. The collected items of the first participant personal information 220A, for example, can be stored in the participant profile database 132 (shown in FIG. 1).

One or more of the collected (or stored) items of the first participant personal information 220A associated with the first conference participant 500A can be selected, at 312, for inclusion on the first virtual stage 230A. As shown in FIG. 5B, each of the collected items of the first participant personal information 220A can be individually considered for inclusion on the first virtual stage 230A. A first collected item of the first participant personal information 220A, such as a participant logo 223 (shown in FIG. 3B), can be designated for selection, at 312A. If selected to be included on the first virtual stage 230A, the first collected item of the first participant personal information 220A can be disposed at a first predetermined position on the first virtual stage 230A, at 314A. The first collected item of the first participant personal information 220A can be disposed at a first predetermined position on the virtual background 232 and/or at a first predetermined position on the virtual foreground 234. The first collected item of the first participant personal information 220A, if not selected, may not be included on the first virtual stage 230A.

Similarly, a second collected item of the first participant personal information 220A, such as participant geographical location information 226 (shown in FIG. 3B), can be designated for selection, at 312B. If selected to be included on the first virtual stage 230A, the second collected item of the first participant personal information 220A can be disposed at a second predetermined position on the first virtual stage 230A, at 314B. The second predetermined position on the first virtual stage 230A can be proximal to, or distal from, the first predetermined position on the first virtual stage 230A at which the first collected item of the first participant personal information 220A is disposed. The second collected item of the first participant personal information 220A can be disposed at a second predetermined position on the virtual background 232 and/or at a second predetermined position on the virtual foreground 234. The second collected item of the first participant personal information 220A, if not selected, may not be included on the first virtual stage 230A.

A third collected item of the first participant personal information 220A, such as participant biographical, demographic and/or other personal information, can be designated for selection, at 312C. If selected to be included on the first virtual stage 230A, the third collected item of the first participant personal information 220A can be disposed at a third predetermined position on the first virtual stage 230A, at 314C. The third predetermined position on the first virtual stage 230A can be proximal to, or distal from, the first predetermined position on the first virtual stage 230A at which the first collected item of the first participant personal information 220A is disposed and/or the second predetermined position on the first virtual stage 230A at which the second collected item of the first participant personal information 220A is disposed. The third collected item of the first participant personal information 220A can be disposed at a third predetermined position on the virtual background 232 and/or at a third predetermined position on the virtual foreground 234. The third collected item of the first participant personal information 220A, if not selected, may not be included on the first virtual stage 230A. Each collected item of the first participant personal information 220A thereby can be designated for selection, at 312 and, if selected, can be disposed at a predetermined position on the first virtual stage 230A, at 314.

In selected embodiments, at least one collected item of the first participant personal information 220A, such as a participant name 221 (shown in FIG. 3B), can be predesignated for inclusion on the first virtual stage 230A. Stated somewhat differently, the predesignated item of the first participant personal information 220A is not considered for selection, at 312, but instead is predesignated to be disposed, by default, at a relevant position on the first virtual stage 230A. The relevant position on the first virtual stage 230A can be proximal to, or distal from, the predetermined positions on the first virtual stage 230A at which the other collected items of the first participant personal information 220A are disposed. The predesignated item of the first participant personal information 220A can be disposed at a relevant position on the virtual background 232 and/or at relevant position on the virtual foreground 234.

Figure 6A:
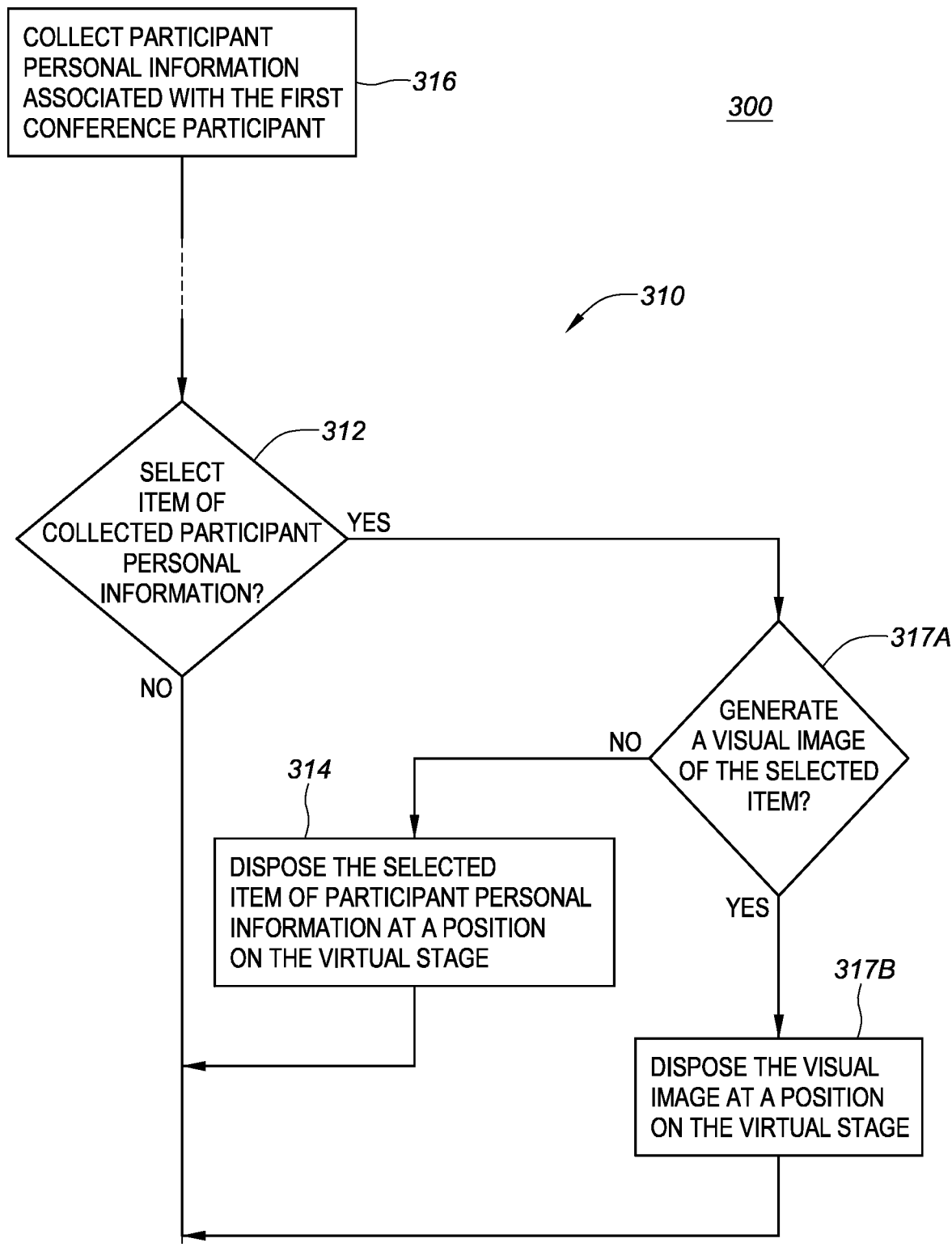
FIG. 6A is a detailed flow chart diagram illustrating an exemplary alternative embodiment of the method of FIG. 5B, wherein the method includes generating a visual image for a selected item of the collected participant personal information and superimposing the visual image and the virtual stage.

The method 300 optionally can include generating a visual image for at least one of the items 229 of participant personal information 220. Turning to FIG. 6A, the method 300 is shown as being configured to generate a visual image of a collected item of the first participant personal information 220A associated with the first conference participant 500A. The collected item of the first participant personal information 220A can be considered for generation of the visual image, at 317A. If designated for generation of the visual image, the visual image of the collected item of the participant personal information 220A can be generated and, at 317B, can be disposed at a predetermined position on the first virtual stage 230A. The visual image of the collected item of the participant personal information 220A can be generated in any suitable manner include via utilization of key word searching and/or artificial intelligence.

For example, if the collected item of the first participant personal information 220A comprises a participant-entered statement "I like cats" is designated for generation of the visual image, the method 300 can generate a cat icon for the participant-entered statement. The cat icon then can be disposed at the predetermined position on the first virtual stage 230A for presentation. In selected embodiments, the first virtual stage 230A can be rendered via a faster HyperText Markup Language (HTML5) canvas with X, Y coordinates. The visual image thereby can be disposed at an X, Y coordinate position on the first virtual stage 230A. The predetermined position on the first virtual stage 230A, for example, can be determined via a frontend logic system (not shown) with the faster HTML5 canvas.

The first virtual stage 230A optionally can be regenerated when the participant-entered data is initially entered and/or subsequently changed. The method 300 advantageously can enable the first conference participant 500A to control whether and, if so, when the first virtual stage 230A is regenerated or maintained. The first conference participant 500A likewise can be permitted to upload a personally-generated virtual background 232 and/or a personally-generated virtual foreground 234, as desired.

Figure 6B:
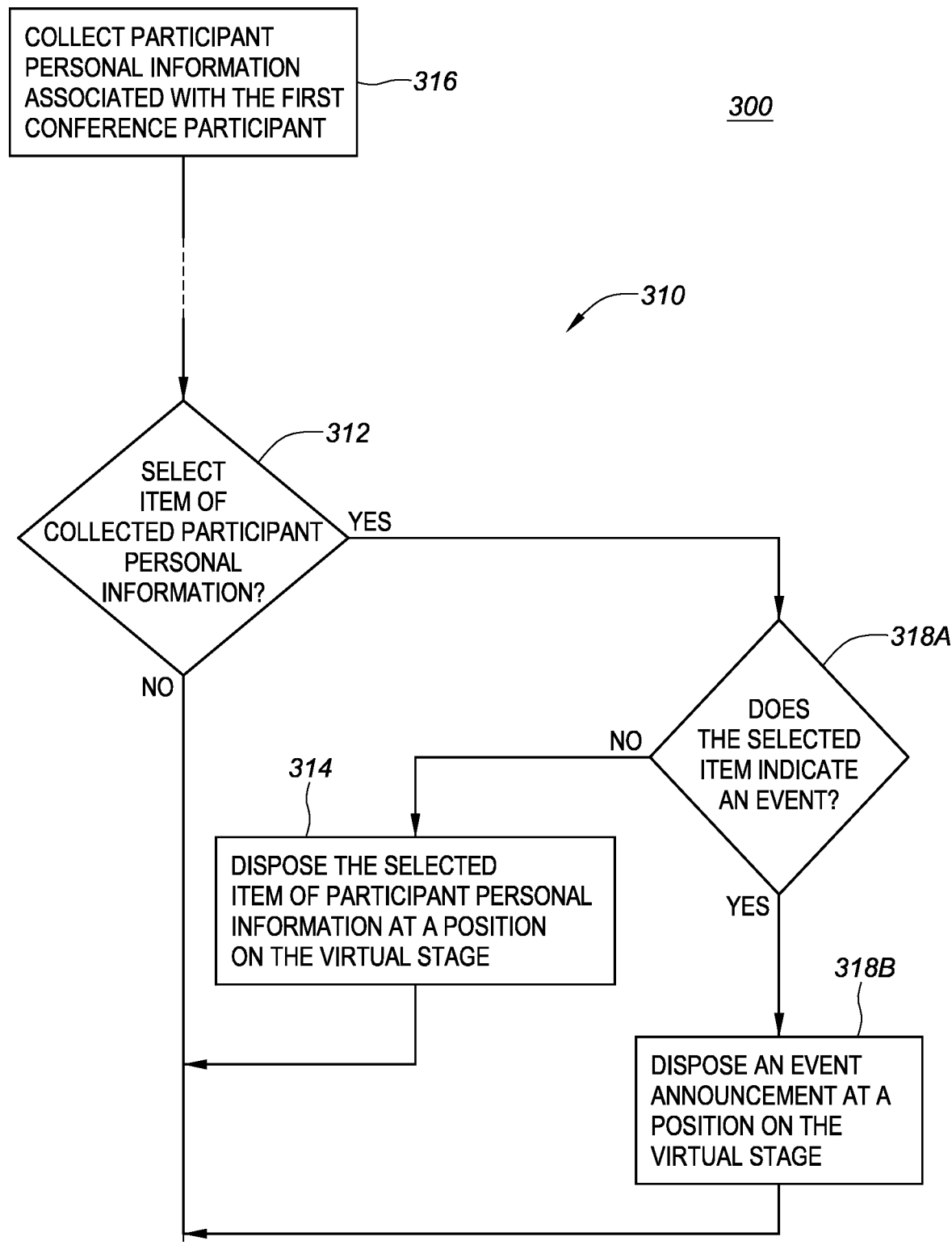
FIG. 6B is a detailed flow chart diagram illustrating another exemplary alternative embodiment of the method of FIG. 5B, wherein the method includes disposing an event announcement on the virtual stage for a selected item of the collected participant personal information that indicates an event.

Additionally and/or alternatively, the method 300 can include generating an announcement based upon at least one of the items 229 of participant personal information 220. Turning to FIG. 6B, the method 300 is shown as being configured to generate an event announcement based upon a collected item of the first participant personal information 220A. The event announcement, for example, can be directed toward a birthday or other event associated with the first conference participant 500A. The event can include an upcoming event associated with the first conference participant 500A. The event announcement can comprise an event invitation, an event acknowledgement, a congratulatory (or condolence) message or any other type of announcement suitable for the type and nature of the event.

The collected item of the first participant personal information 220A can be considered for generation of the event announcement, at 318A. In other words, the method 300 can examine the collected item of the first participant personal information 220A to determine whether the collected item includes, for example, the participant occasion information discussed in more detail above with reference to FIG. 2B. If participant occasion information includes an upcoming event, the event announcement for the upcoming event among the collected item of the participant personal information 220A can be generated. The event announcement for the upcoming event can be generated in any suitable manner include via utilization of key word searching and/or artificial intelligence.

The event announcement for the upcoming event can be disposed at a predetermined position on the first virtual stage 230A, at 318B. Although capable of being disposed on the virtual background 232, the event announcement preferably can be disposed on the virtual foreground 234 to help emphasize the event announcement over the other information presented on the first virtual stage 230A. In selected embodiments, the first virtual stage 230A can be rendered via a faster HTML5 canvas with X, Y coordinates. The event announcement thereby can be disposed at an X, Y coordinate position on the first virtual stage 230A. The predetermined position on the first virtual stage 230A, for example, can be determined via a frontend logic system (not shown) with the faster HTML5 canvas. The event announcement then can be disposed at the predetermined position on the first virtual stage 230A for presentation.

Figure 7:
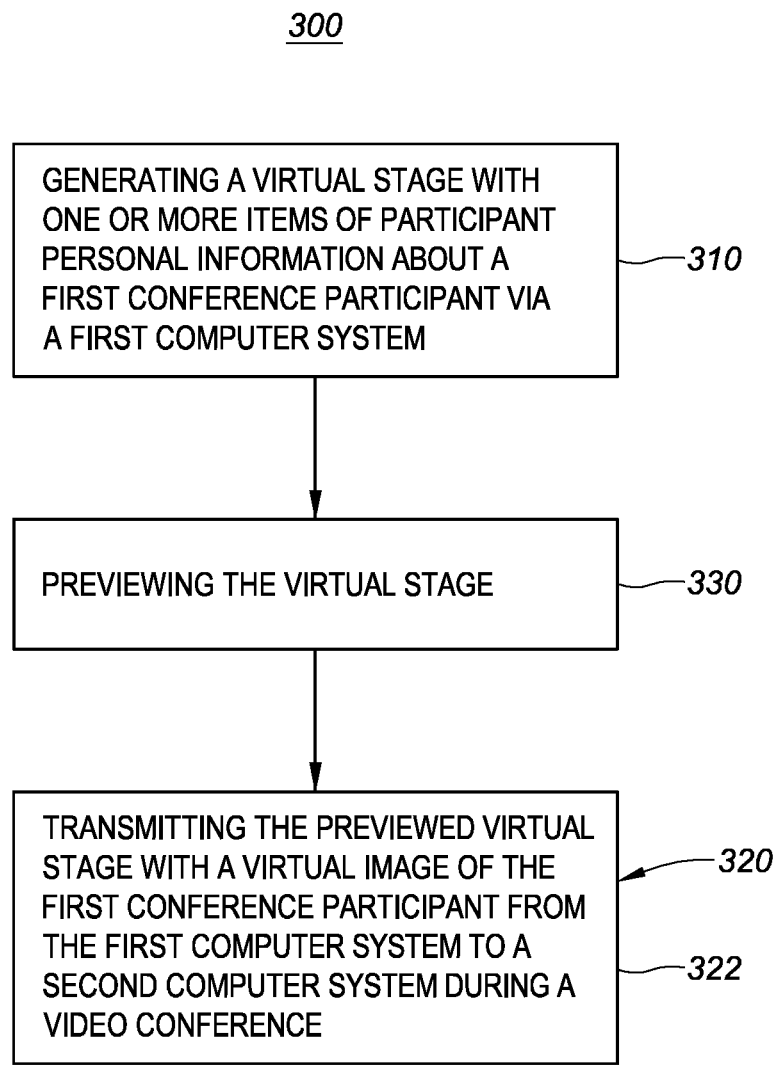
FIG. 7 is a top-level flow chart diagram illustrating still another exemplary embodiment of the method of FIG. 4, wherein the method includes previewing the virtual stage prior to transmission.

In selected embodiments, the method 300 can enable the first conference participant 500A to preview the first virtual stage 230A. Turning to FIG. 7, the method 300 is shown as including previewing the first virtual stage 230A (shown in FIG. 2B), at 330. The first conference participant 500A (shown in FIG. 1), for example, can preview the first virtual stage 230A via the video display system 114B (shown in FIG. 2A) of the first participant computer system 110A (shown in FIG. 2A). The first conference participant 500A can preview the first virtual stage 230A, for instance, during and/or after generation of the first virtual stage 230A, at 310. In other words, the method 300 can enable the first conference participant 500A to preview the first virtual stage 230A as the collected items 229 of the first participant personal information 220A are being selected and/or disposed on the first virtual stage 230A. Additionally and/or alternatively, the first conference participant 500A can preview the first virtual stage 230A after generation of the first virtual stage 230A, at 310, is complete. In selected embodiments, the first virtual stage 230A can be visually presented as a thumbnail preview via the first participant computer system 110A.

Previewing the first virtual stage 230A, at 330, can include enabling the first conference participant 500A to revise or otherwise edit the first virtual stage 230A during and/or after generation of the first virtual stage 230A, at 310. The first conference participant 500A, for example, can utilize the user interface input system 115 (shown in FIG. 2A) of the first participant computer system 110A to edit the first virtual stage 230A. In selected embodiments, the first participant computer system 110A can provide a drag and drop user interface for image previewing of the HTML5 canvas and creation of an image after the first conference participant 500A is satisfied.

Editing of the first virtual stage 230A can include, but is not limited to, deselecting one or more of the items 229 of the first participant personal information 220A selected during generation of the first virtual stage 230A, at 310, selecting one or more additional collected items 229 of the first participant personal information 220A that were not selected during generation of the first virtual stage 230A, at 310, and/or editing one or more of the selected items 229 of the first participant personal information 220A. Additionally and/or alternatively, editing of the first virtual stage 230A can include adjusting the position of one or more of the selected items 229 of the first participant personal information 220A disposed on the first virtual stage 230A. Previewing the first virtual stage 230A, at 330, optionally can include enabling the first conference participant 500A to preview the first virtual stage 230A, during and/or after editing. Once the first virtual stage 230A has been previewed and optionally edited, the previewed first virtual stage 230A can be transmitted, at 322, from the first participant computer system 110A to the second participant computer system 110B associated with the second conference participant 500B and/or one or more other participant computer systems 110 associated with the other conference participants 500.

The first virtual stage 230A, for example, can be transmitted with the first visual image 210A of the first conference participant 500A, at 320, from the first participant computer system 110A to the second participant computer system 110B associated with the second conference participant 500B and/or one or more other participant computer systems 110 associated with the other conference participants 500 during the video conference. In selected embodiments, the video conference can begin by transmitting the first visual image 210A with the first virtual stage 230A to the second participant computer system 110B and/or one or more other participant computer systems 110. At least one item 229 of the first participant personal information 220A, at least one item 229 of the second participant personal information 220B and/or at least one item 229 of the participant personal information 220 of the other conference participants 500 can be disposed on the transmitted first virtual stage 230A. The first virtual stage 230A thereby can be visually presented at the second participant computer system 110B and/or the other participant computer systems 110 as a welcoming or other introductory virtual stage 230.

Figure 8:
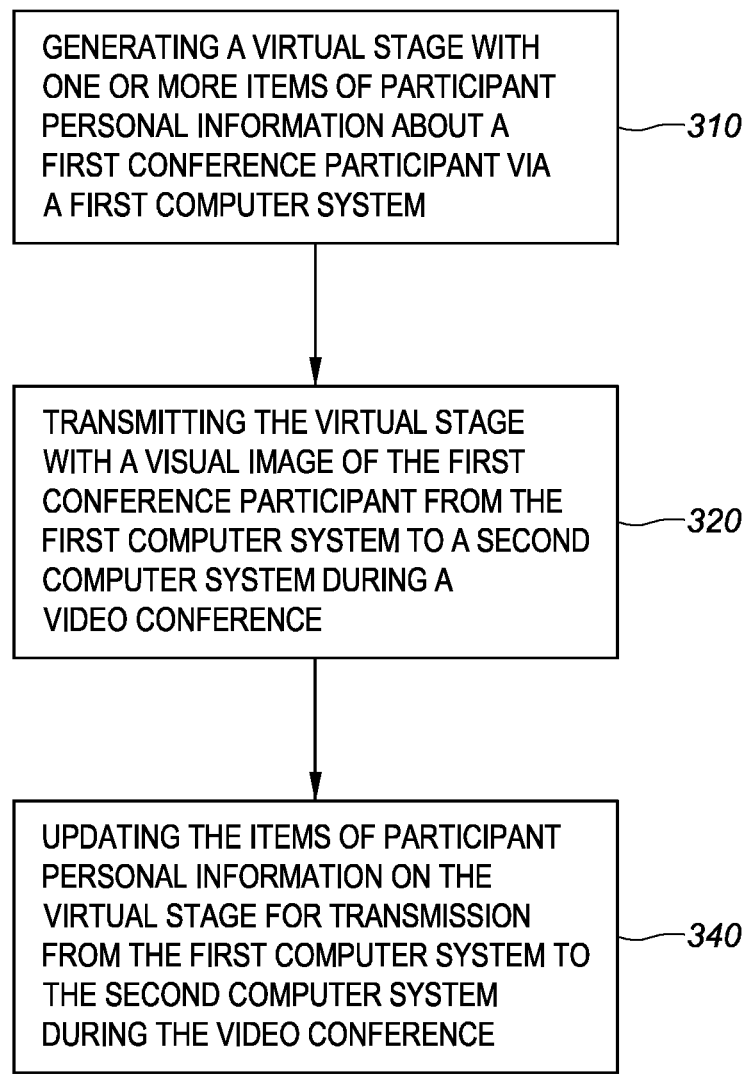
FIG. 8 is a top-level flow chart diagram illustrating yet another exemplary embodiment of the method of FIG. 4, wherein the method includes updating the selected participant personal information on the virtual stage during the video conference.

In selected embodiments, the first virtual stage 230A can comprise a dynamic virtual stage. Stated somewhat differently, one or more of the selected items 229 of the participant personal information 220 can be initially disposed at respective first positions on the virtual stage 230 and later moved to respective second (or a different) positions on the virtual stage 230 during the video conference. At least one selected item 229 of the participant personal information 220 optionally can be repeated moved on the virtual stage 230 during the video conference. The method 300 is illustrated in FIG. 8 as including updating the selected items 229 of the participant personal information 220 disposed on the virtual stage 230, at 340, for transmission to the second participant computer system 110B and/or one or more other participant computer systems 110 associated with the other conference participants 500.

The virtual stage 230, for example, can be continuously and/or periodically updated via a background process. If the virtual stage 230 is rendered via the faster HTML5 canvas with the X, Y coordinates, the X, Y coordinate position of the respective items 229 of participant personal information 220 within the virtual stage 230 can change during the video conference. In selected embodiments, the position changes for the selected items 229 of participant personal information 220 can be implemented via a frontend logic system with the HTML5 canvas.

The respective positions of the selected items 229 of the participant personal information 220 can change based upon a number, type and/or nature of the participant personal information 220 disposed on the virtual stage 230. If the participant personal information 220 does not include the participant name 221 (shown in FIG. 3B) for a selected conference participant 500, for example, one or more other items 229 of the participant personal information 220, such as the participant title information 222 (shown in FIG. 3B), associated with the selected conference participant 500 can be disposed on the virtual stage 230.

The first dynamic virtual stage 230A, for example, can initially comprise the introductory virtual stage 230 at the beginning of the video conference and later can be replaced by the selected items 229 of the first participant personal information 220A as the video conference continues past the introductory phase. At least one item 229 of the first participant personal information 220A relevant to each video conference agenda topic optionally can be successive disposed on the virtual stage 230 during the video conference. In other words, items 229 of the first participant personal information 220A relevant to a first video conference agenda topic can be disposed on the virtual stage during discussion of the first video conference agenda topic and replaced by items 229 of the first participant personal information 220A relevant to a second video conference agenda topic as the discussion changes to the second video conference agenda topic.

In selected embodiments, the selected items 229 of the first participant personal information 220A can be dynamically disposed on the first dynamic virtual stage 230A. The selected items 229 of the first participant personal information 220A, in other words, can be combined or otherwise disposed in number, type, selection, position, arrangement and/or configuration in a manner that changes over time. The first dynamic virtual stage 230A, for example, can comprise a first combination of selected items 229 of the first participant personal information 220A in a first configuration at a first time during the video conference, a second combination of selected items 229 of the second participant personal information 220A in a second configuration at a second time during the video conference, a third combination of selected items 229 of the third participant personal information 220A in a third configuration at a third time during the video conference and so on.

The number, type, selection, position, arrangement and/or configuration of the selected items 229 of the first participant personal information 220A can be the same and/or different as the video conference proceeds. In selected embodiments, the number, type, selection, position, arrangement and/or configuration of the selected items 229 of the first participant personal information 220A can change to accommodate any movement, including, but not limited to, any horizontal and/or vertical movement, of the first visual image 210A of the first conference participant 500A relative to the first dynamic virtual stage 230A. The first dynamic virtual stage 230A thereby can prevent the selected items 229 of the first participant personal information 220A from being obscured by the first visual image 210A. Additionally and/or alternatively, the number, type, selection, position, arrangement and/or configuration of the selected items 229 of the first participant personal information 220A can change if a number of the conference participants 500 changes as one or more conference participants 500 enter and/or exit the video conference. Stated somewhat differently, the selected items 229 of the first participant personal information 220A disposed on the first dynamic virtual stage 230A can change if a number of the conference participants 500 changes.

In selected embodiments, the method 300 can include disposing one or more messages 240 on the first dynamic virtual stage 230A as illustrated with reference to the second participant computer system 110B illustrated in FIGS. 9A-D. Stated somewhat differently, the first dynamic virtual stage 230A can dynamically include at least one message 240 with the selected items 229 of the first participant personal information 220A. The messages 240 can be disposed on the first dynamic virtual stage 230A during the video conference and can comprise any suitable type of message, including, but not limited to, at least one message automatically generated by the video conference system 100 and/or at least one message generated by one or more of the conference participants 500.

Optionally, the messages 240 can include information regarding the first conference participant 500A and/or at least one of the other conference participants 500 and/or can be addressed to, or otherwise directed toward, the second conference participant 500B and/or at least one of the other conference participants 500. The messages 240, in other words, can include information about some or all of conference participants 500 and/or be directed toward some or all of the conference participants 500. Stated somewhat differently, the messages 240 can include private messages sent only to predetermined conference participants 500 and/or public messages sent to all of the conference participants 500.

The messages 240 can remain on the first dynamic virtual stage 230A throughout the remainder of the video conference and/or can be disposed on the first dynamic virtual stage 230A for a predetermined time interval. The predetermined time interval can be the same and/or different among the messages 240. In selected embodiments, the predetermined time interval for each message 240 can be based upon a type, timing, importance and/or source of the message 240. A message 240 for introducing or otherwise welcoming one or more conference participants 500, for example, can remain on the first dynamic virtual stage 230A during the introductory phase of the video conference. Additionally and/or alternatively, a preselected message 240 can be associated with a first predetermined time for being automatically added to the first dynamic virtual stage 230A and/or a second predetermined time for being automatically removed from the first dynamic virtual stage 230A.

Figure 9A:
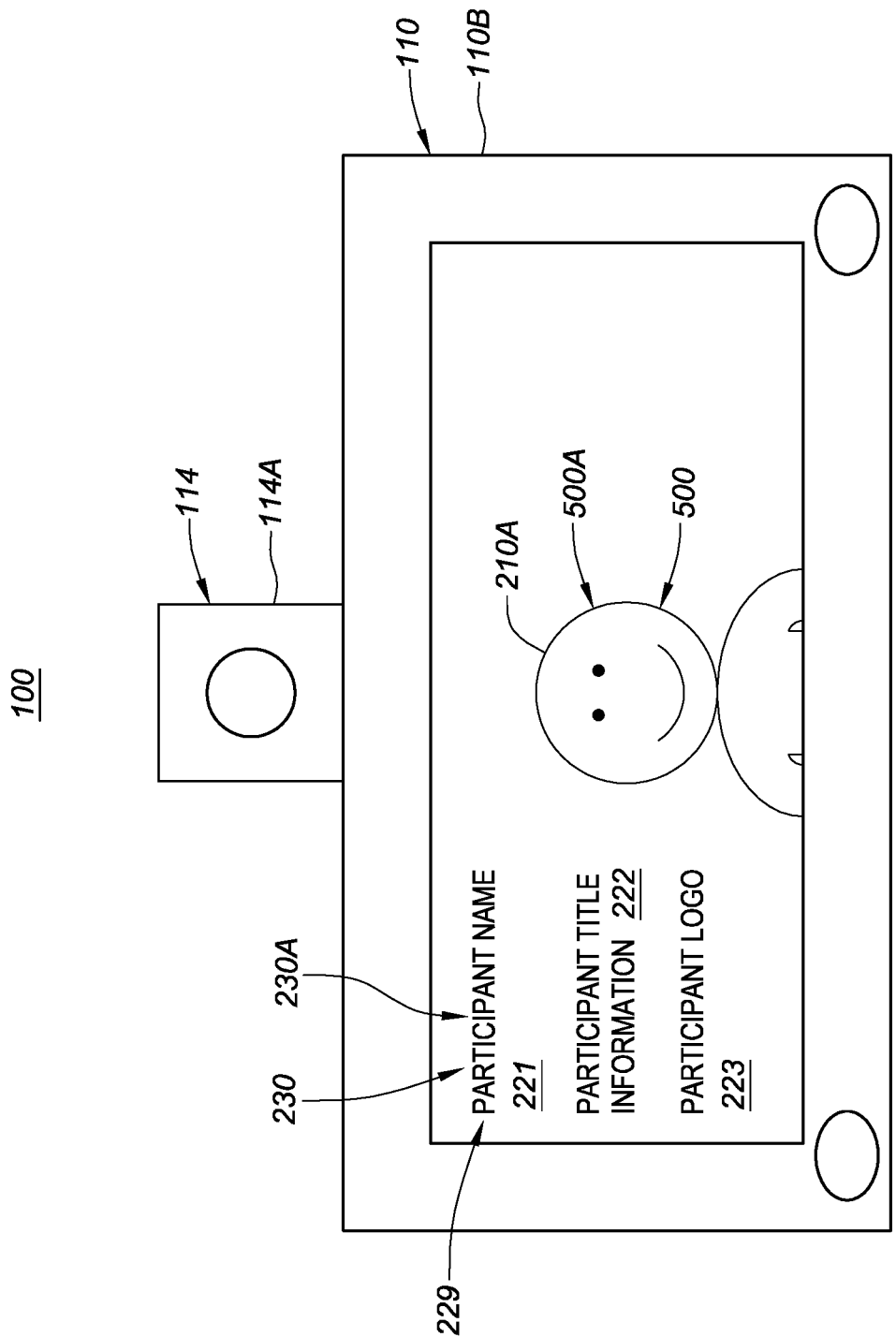

Turning to FIG. 9A, the second participant computer system 110B is shown as visually presenting an exemplary first dynamic virtual stage 230A during the video conference. The first dynamic virtual stage 230A can be presented with the first visual image 210A of the first conference participant 500A and/or can include one or more selected items 229 of the first participant personal information 220A associated with the first conference participant 500A in the manner discussed in more detail above with reference to the virtual stage 230 shown and described with reference to FIG. 2B. The selected items 229 of the first participant personal information 220A are illustrated in FIG. 9A as including the participant name 221, the participant title information 222 and the participant logo 223 associated with the first conference participant 500A.

Figure 9B:
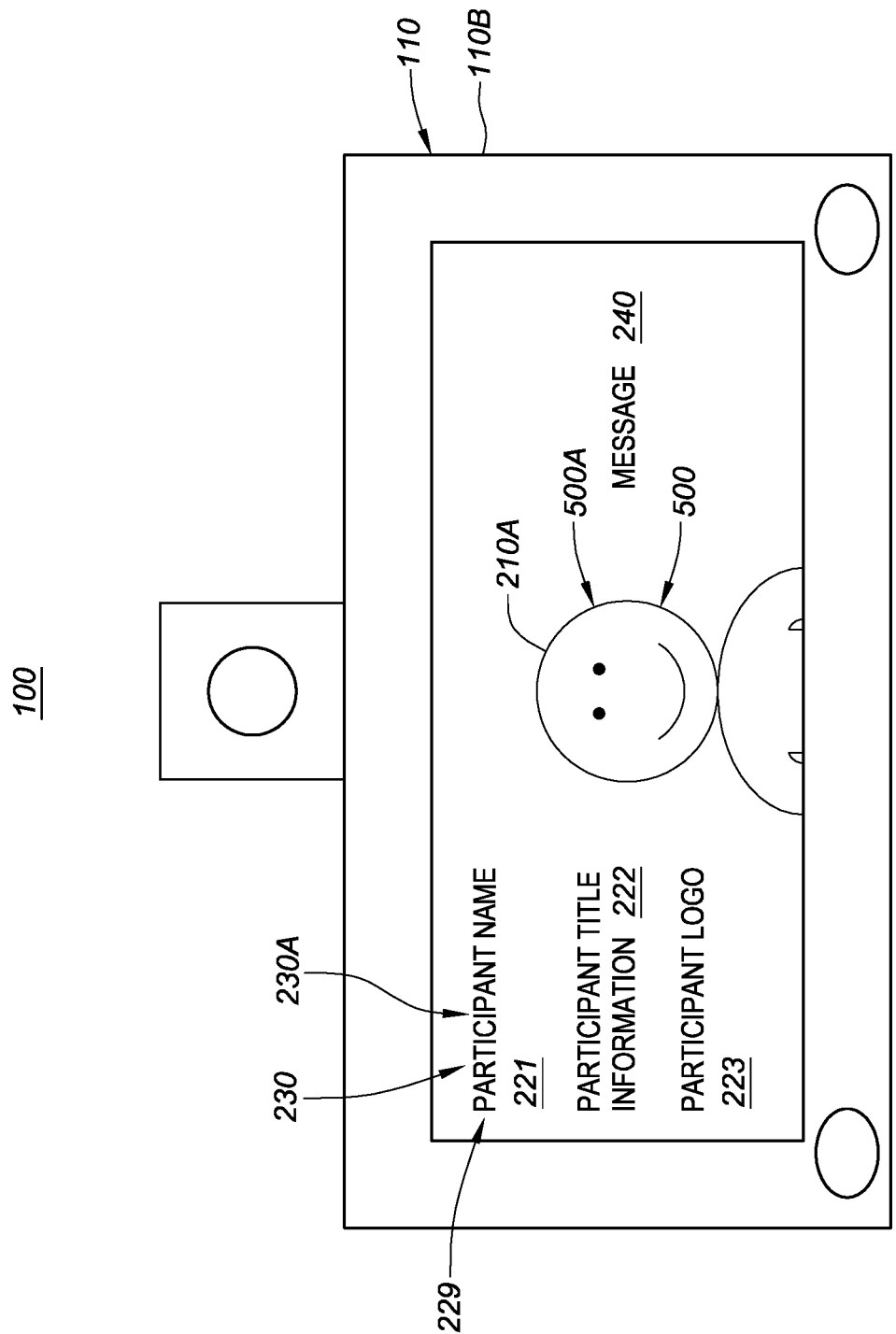
Figure 9C:
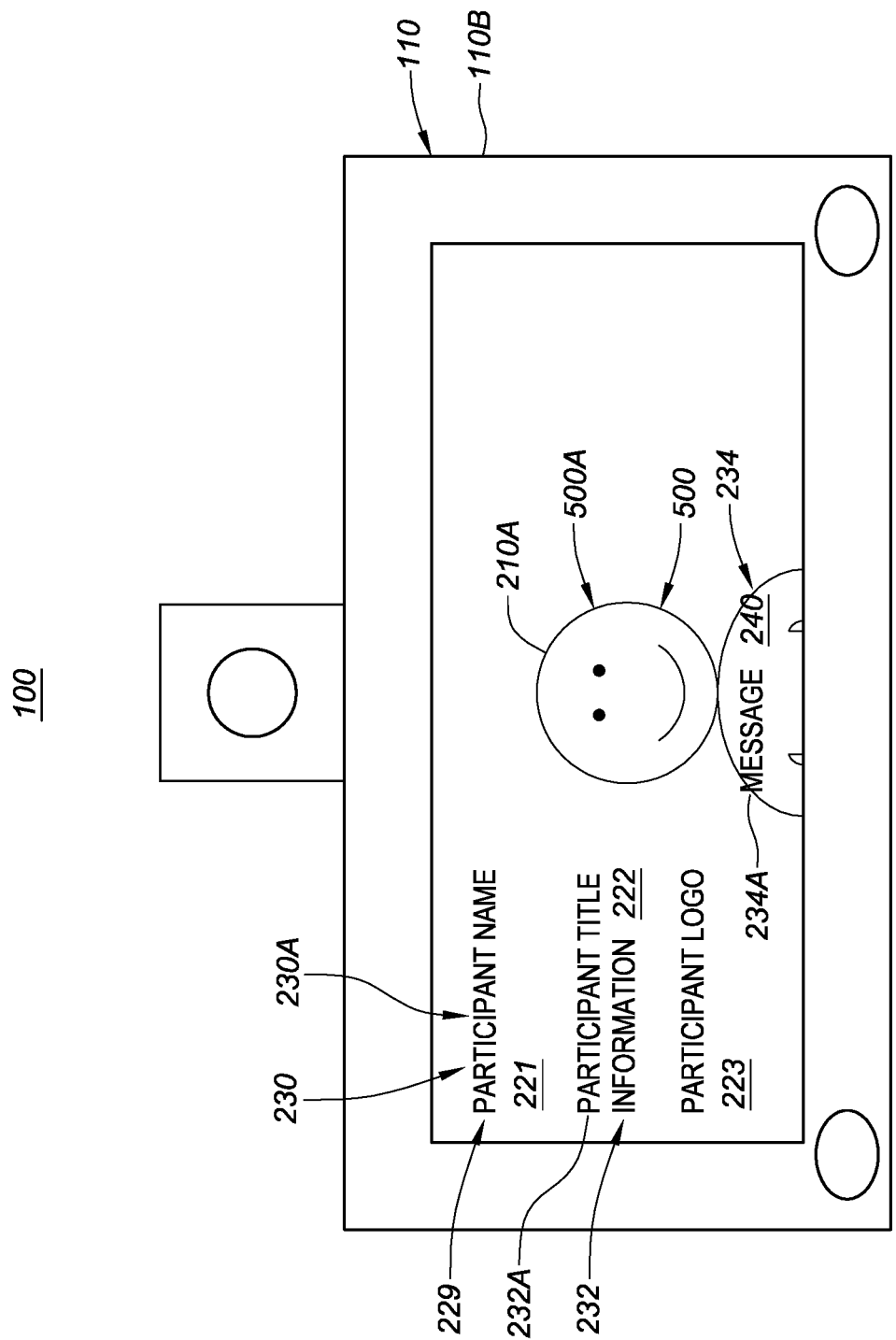

Each message 240 can be disposed at any suitable position on the first dynamic virtual stage 230A as illustrated in FIGS. 9B-D. Preferably, each message 240 is positioned so as to avoid obscuring the selected items 229 disposed on the first dynamic virtual stage 230A, the first visual image 210A and/or any other messages 240. In selected embodiments, the message 240 can be disposed at any available position on the first dynamic virtual stage 230A as shown in FIG. 9B. The message 240, in other words, can be disposed at a position on the first dynamic virtual stage 230A that is separate from the selected items 229, the first visual image 210A and/or any other messages 240.

In selected embodiments, the messages 240 can be disposed on a first virtual background 232A of the first dynamic virtual stage 230A for presentation behind the first visual image 210A of the first conference participant 500A and/or a first virtual foreground 234A of the first dynamic virtual stage 230A for presentation in front of the first visual image 210A. FIG. 9C shows the selected items 229 of the first participant personal information 220A as being disposed on the first virtual background 232A and the message 240 as being disposed on the first virtual foreground 234A. One or more messages 240 optionally can be disposed on the first virtual foreground 234A to help emphasize the messages 240 over the other information presented on the first dynamic virtual stage 230A.

Additionally and/or alternatively, the number, type, selection, position, arrangement and/or configuration of the selected items 229 of the first participant personal information 220A disposed on the first dynamic virtual stage 230A can change, for example, to accommodate the messages 240. One or more of the selected items 229 of the first participant personal information 220A, for example, can be removed from the first dynamic virtual stage 230A to permit the messages 240 to be disposed on the first dynamic virtual stage 230A. At least one selected item 229 of the first participant personal information 220A optionally can be moved from a first position to a second position on the first dynamic virtual stage 230A. As shown in FIG. 9D, the participant logo 223 associated with the first conference participant 500A can be moved from a first position to a second position on the first dynamic virtual stage 230A with the message 240 being disposed at the first position vacated by the participant logo 223. In selected embodiments, the participant logo 223 can return to the first position on the first dynamic virtual stage 230A if the message 240 is later removed from the first dynamic virtual stage 230A.

Any suitable type of messages 240 can be disposed on the first dynamic virtual stage 230A. Exemplary messages 240, for example, can include one or more event announcements in the manner discussed in more detail above.

If an attending conference participant 500 exits the video conference, the first dynamic virtual stage 230A can be updated to include a departure message 240 and, as needed, change the position of one or more selected items 229 of the first participant personal information 220A to accommodate the departure message 240. The first dynamic virtual stage 230A alternatively can be updated to include an arrival message 240 for a newly-arrived conference participant 500 and, as needed, change the position of one or more selected items 229 of the first participant personal information 220A to accommodate the arrival message 240. Optionally, one or more conference time messages 240 can be disposed on the first dynamic virtual stage 230A. Exemplary conference time messages 240 can include, but are not limited to, messages 240 regarding remaining conference time and other conference time milestones. As needed, the number, type, selection, position, arrangement and/or configuration of the selected items 229 of the first participant personal information 220A disposed on the first dynamic virtual stage 230A can change, for example, to accommodate the conference time messages 240 in the manner discussed in more detail above.

In selected embodiments, the video conference system 100 and related method 300 advantageously can enable the conference participants 500 to exchange messages 240 during the video conference. The first conference participant 500A, for example, can send a message 240 to one or more of the other conference participants 500. With reference to FIGS. 9B-D, the first participant computer system 110A (shown in FIG. 1), for example, can enable the first conference participant 500A to prepare a message 240 for transmission to the second participant computer system 110B associated with the second conference participant 500B. The message 240 preferably is disposed on the first dynamic virtual stage 230A and is transmitted as a part of the first dynamic virtual stage 230A with the first visual image 210A to the second participant computer system 110B. The second participant computer system 110B can visually present the message 240 in the manner discussed in more detail herein with reference to FIGS. 9B-D.

The message 240, for example, can comprise a reminder message to the second conference participant 500B and/or other conference participants 500 about an amount of time remaining in the video conference and/or a welcome message for acknowledging a new conference participant 500 joining the video conference. Additionally and/or alternatively, the message 240 can include one or more unique icebreaker questions based upon an overlap between the first participant personal information 220A associated with the first conference participant 500A and the participant personal information 220 associated with one or more of the other conference participant 500. An exemplary icebreaker question can be based upon an overlap between the first participant personal information 220A associated with the first conference participant 500A and the second participant personal information 220B associated with the second conference participant 500B. In selected embodiments, the first conference participant 500A can initiate automatic generation of one or more icebreaker questions.

The video conference system 100 and related method 300 optionally can enable the first conference participant 500A to preview a list of one or more icebreaker questions. The video conference system 100 and related method 300, for example, can enable the first conference participant 500A to preview the list of one or more icebreaker questions in the manner that the method 300 enabled the first conference participant 500A to preview the first virtual stage 230A as discussed herein with reference to FIG. 7. In selected embodiments, the first conference participant 500A can preview the list of icebreaker questions via the video display system 114B (shown in FIG. 2A) of the first participant computer system 110A (shown in FIG. 2A).

The first conference participant 500A can preview the list of icebreaker questions, for instance, during and/or after generation of the first virtual stage 230A. In other words, the method 300 can enable the first conference participant 500A to preview the list of icebreaker questions as the collected items 229 of the first participant personal information 220A are being selected and/or disposed on the first virtual stage 230A. The first conference participant 500A thereby can edit and/or select one or more of the previewed icebreaker questions on the list. The one message 240 with the selected icebreaker questions can be disposed on the first dynamic virtual stage 230A and transmitted as a part of the first dynamic virtual stage 230A with the first visual image 210A to the second participant computer system 110B. The second participant computer system 110B can visually present the previewed icebreaker questions included in the message 240 in the manner discussed in more detail herein with reference to FIGS. 9B-D.

Although shown and described with reference to FIGS. 4-9C as presenting the first visual image 210A of the first conference participant 500A with a first virtual stage 230A including the first participant personal information 220A associated with the first conference participant 500A for purposes of illustration only, the video conference system 100 and related method 300 can be configured to present a visual image 210 with a virtual stage 230 including participant personal information 220 for any suitable number of conference participants 500. Each participant computer system 110, in other words, can generate a virtual stage 230 with participant personal information 220 associated with the relevant conference participant(s) 500 for transmission with a visual image 210 of the relevant conference participant(s) 500 to the participant computer systems 110 of the other conference participants 500 during the video conference. Each participant computer system 110 likewise can be configured to visually present the visual image 210 with the virtual stage 230 for each of the other conference participants 500 as received from the other participant computer systems 110 during the video conference.

Although multiple conference participants 500 can share a single (or common) virtual stage 230, the virtual stages 230 associated with each conference participant 500 preferably is unique. The number, type, selection, position, arrangement and/or configuration of the selected items 229 of the participant personal information 220 associated with one conference participant 500, for example, can be the same as, and/or different from, the number, type, selection, position, arrangement and/or configuration of the selected items 229 of the participant personal information 220 associated with a different conference participant 500.

Exemplary number, type, selection, position, arrangement and/or configuration of the selected items 229 of the participant personal information 220 for three illustrative conference participants 500 are shown and described herein with reference to FIGS. 3A-C. The selected items 229 of participant personal information 220 for the first conference participant 500A, for instance, can disposed at a lower portion of the virtual stages 230 as illustrated in FIG. 3B; whereas, the selected items 229 of participant personal information 220 for second and Nth conference participants 500B, 500N can be disposed at an upper left-hand portion of the respective virtual stages 230 as illustrated in FIGS. 3A, C.

In selected embodiments, one or more of the virtual stages 230 can comprise dynamic virtual stages in the manner discussed in more detail with reference to FIGS. 8 and 9A-D. One or more of the selected items 229 of the participant personal information 220 associated with a pre-determined dynamic virtual stage 230 thereby can be initially disposed at respective first positions on the dynamic virtual stage 230 and later moved to respective second (or different) positions on the dynamic virtual stage 230 during the video conference. At least one selected item 229 of the participant personal information 220 optionally can be repeated moved on the dynamic virtual stage 230 during the video conference.

In selected embodiments, one or more of the features disclosed herein can be provided as a computer program product being encoded on one or more non-transitory machine-readable storage media. As used herein, a phrase in the form of at least one of A, B, C and D herein is to be construed as meaning one or more of A, one or more of B, one or more of C and/or one or more of D. Likewise, a phrase in the form of A, B, C or D as used herein is to be construed as meaning A or B or C or D. For example, a phrase in the form of A, B, C or a combination thereof is to be construed as meaning A or B or C or any combination of A, B and/or C.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for generating a dynamic virtual stage for presentation during a video conference, comprising:

collecting one or more items of participant personal information about a first conference participant; wherein the personal information include a participant name, participant title information, a participant logo, participant pronoun preference information, participant name pronunciation information, participant geographical location information, personal interest information, participant image indicia, participant contact information, participant biographical, participant demographic, participant occasion information or a combination thereof each being associated with the first conference participant, defining a boundary of the virtual stage and disposing at least one of the collected items of participant personal information at respective positions within the boundary via a processing circuit associated with the first conference participant;

wherein the dynamic virtual stage is updated to include an arrival message for a newly-arrived conference participant;

changing the position of one or more selected items of the first participant personal information to accommodate the arrival message preventing all the one or more selected items from being obscured by a dynamic visual image of the first conference participant;

and transmitting the virtual stage with the dynamic visual image of the first conference participant from the processing circuit to a distal display system associated with a second conference participant and a second distal display system associated with a third conference participant for presentation during the video conference, wherein the processing circuit is configured to dynamically update the virtual stage by updating the collected items of participant personal information disposed on the virtual stage and to transmit the updated virtual stage with the dynamic visual image of the first conference participant to the distal display system and the second distal display system for presentation during the video conference.

2. The method of claim 1, wherein said collecting the one or more items of participant personal information includes automatically pulling at least one item of the participant personal information from an external data resource and receiving at least one item of the participant personal information from the first conference participant.

3. The method of claim 1, wherein said collecting the one or more items of participant personal information includes enriching at least one item of the collected participant personal information, and wherein said disposing the at least one of the collected items includes disposing the at least one item of the enriched participant personal information at respective positions within the boundary.

4. The method of claim 1, wherein said defining the boundary of the virtual stage comprises defining a boundary of the virtual background, wherein said transmitting the virtual stage comprises transmitting the virtual background with the dynamic visual image of the first conference participant from the processing circuit to a distal display system, and wherein the processing circuit is configured to dynamically update the virtual background by updating the collected items of participant personal information disposed on the virtual background and to transmit the updated virtual background with the dynamic visual image of the first conference participant to the distal display system for presentation during the video conference.

5. The method of claim 1, wherein said defining the boundary of the virtual stage comprises defining a boundary of the virtual foreground, wherein said transmitting the virtual stage comprises transmitting the virtual foreground with the dynamic visual image of the first conference participant from the processing circuit to a distal display system, and wherein the processing circuit is configured to dynamically update the virtual foreground by updating the collected items of participant personal information disposed on the virtual foreground and to transmit the updated virtual foreground with the dynamic visual image of the first conference participant to the distal display system for presentation during the video conference.

6. The method of claim 1, wherein said disposing the at least one of the collected items of participant personal information includes generating a visual image of a selected collected item of participant personal information and disposing the visual image at a predetermined position within the boundary.

7. The method of claim 1, wherein said disposing the at least one of the collected items of participant personal information includes enabling the first conference participant to manually dispose the at least one of the collected items of participant personal information at the respective positions within the boundary via the processing circuit.

8. The method of claim 1, further comprising generating a preview of the virtual stage for presentation via a display circuit associated with the first conference participant prior to said transmitting the virtual stage.

9. The method of claim 8, further comprising enabling the first conference participant to update the collected items of participant personal information disposed within the boundary via the preview of the virtual stage.

10. The method of claim 9, wherein said enabling the first conference participant includes enabling the first conference participant to delete at least one of the collected items of participant personal information presented in the preview of the virtual stage, to add a new collected item of participant personal information to the preview of the virtual stage, to adjust a position of at least one of the collected items of participant personal information presented in the preview of the virtual stage, or a combination thereof.

11. The method of claim 1, further comprising transmitting a message from the first conference participant with the virtual stage to the distal display system associated with the second conference participant for presentation during the video conference.

12. The method of claim 1, wherein said disposing the at least one of the collected items of participant personal information includes rendering the at least one of the collected items of participant personal information at respective X, Y position coordinates within the boundary via a backend logic system of a faster HyperText Markup Language (HTML5) canvas with X, Y coordinates.

13. The method of claim 1, further comprising: collecting one or more items of participant personal information about the second conference participant; and generating an event announcement based upon the collected items of participant personal information about the second conference participant via the processing circuit and transmitting the event announcement with the virtual stage from the processing circuit to the distal display system associated with the second conference participant for presentation during the video conference.

14. The method of claim 1, wherein the processing circuit is configured to dynamically update the virtual stage by deleting at least one of the collected items of participant personal information disposed within the boundary, adding a new collected item of participant personal information to a predetermined position within the boundary, adjusting a position of at least one of the collected items of participant personal information within the boundary, or a combination thereof.

15. The method of claim 14, wherein the respective positions of the collected items of participant personal information within the boundary are adjusted based upon at least one collected items of participant personal information being deleted from the virtual stage, at least one collected items of participant personal information being added to the virtual stage, or both.

16. The method of claim 14, wherein the respective positions of the collected items of participant personal information within the boundary are adjusted to prevent obfuscation of a message from the first conference participant being transmitted with the virtual stage to the distal display system associated with the second conference participant for presentation during the video conference.

17. A computer program product for generating a dynamic virtual stage for presentation during a video conference, the computer program product being encoded on one or more non-transitory machine-readable storage media and comprising:

instruction for collecting one or more items of participant personal information about a first conference participant;

instruction for defining a boundary of the virtual stage;

instruction for disposing at least one of the collected items of participant personal information at respective positions within the boundary via a processing circuit associated with the first conference participant; and wherein the dynamic virtual stage is updated to include an arrival message for a newly-arrived conference participant;

instruction for changing the position of one or more selected items of the first participant personal information to accommodate the arrival message preventing all the one or more selected items from being obscured by a dynamic visual image of the first conference participant;

instruction for transmitting the virtual stage with a dynamic visual image of the first conference participant from the processing circuit to a display system associated with a second conference participant and a second distal display circuit associated with a third conference participant for presentation during the video conference, wherein the processing circuit is configured to dynamically update the virtual stage by updating the collected items of participant personal information disposed on the virtual stage and to transmit the updated virtual stage with the dynamic visual image of the first conference participant to the distal display system and the second distal display system for presentation during the video conference.

18. A system for generating a dynamic virtual stage for presentation during a video conference, comprising:
    a database circuit for collecting one or more items of participant personal information about a first conference participant, the participant personal information including a participant name, participant title information, a participant logo, participant pronoun preference information, participant name pronunciation information, participant geographical location information, personal interest information, participant image indicia, participant contact information, participant biographical, participant demographic, participant occasion information or a combination thereof each being associated with the first conference participant; and
    a processing circuit associated with the first conference participant being configured to:
        define a boundary of the virtual stage;
        dispose at least one of the collected items of participant personal information at respective positions within the boundary;
        change the position of one or more selected items of the first participant personal information to accommodate the arrival message preventing all the one or more selected items from being obscured by a dynamic visual image of the first conference participant;
        transmit the virtual stage with a dynamic visual image of the first conference participant to a distal display circuit associated with a second conference participant and a second distal display circuit associated with a third conference participant for presentation during the video conference; and
        dynamically update the virtual stage by updating the collected items of participant personal information disposed on the virtual stage and to transmit the updated virtual stage with the dynamic visual image of the first conference participant to the distal display system and the second distal display system for presentation during the video conference,
    wherein the dynamic virtual stage is updated to include an arrival message for a newly-arrived conference participant.

* * * * *